(12) United States Patent
Gass et al.

(10) Patent No.: US 8,469,067 B2
(45) Date of Patent: Jun. 25, 2013

(54) DETECTION SYSTEMS FOR POWER EQUIPMENT

(75) Inventors: Stephen F. Gass, West Linn, OR (US); Louis R. Slamka, Vancouver, WA (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 13/135,391

(22) Filed: Jul. 2, 2011

(65) Prior Publication Data
US 2012/0024427 A1 Feb. 2, 2012

Related U.S. Application Data

(63) Continuation of application No. 12/319,213, filed on Dec. 31, 2008, now Pat. No. 7,971,613.

(60) Provisional application No. 61/009,854, filed on Dec. 31, 2007.

(51) Int. Cl.
  *B23Q 16/00* (2006.01)
(52) U.S. Cl.
  USPC ............................ 144/394; 144/421; 144/427
(58) Field of Classification Search
  USPC ......... 144/382, 392, 394, 400–404, 410–423, 144/427; 83/62, 62.1, 63, 64, 66, 76.1, 76.3, 83/62.5, 58; 318/431–434; 173/2, 20, 216, 173/217, 171, 176
  See application file for complete search history.

(56) References Cited

U.S. PATENT DOCUMENTS

| | | | |
|---|---|---|---|
| 4,453,112 A | 6/1984 | Sauer et al. | |
| 7,093,668 B2 | 8/2006 | Gass et al. | |
| 7,308,843 B2 | 12/2007 | Gass et al. | |
| 7,421,932 B1 | 9/2008 | Heinzmann et al. | |
| 7,472,634 B2 | 1/2009 | Gass et al. | |
| 7,509,899 B2 | 3/2009 | Gass et al. | |
| 7,525,055 B2 | 4/2009 | Gass et al. | |
| 7,536,238 B2 | 5/2009 | Gass | |
| 7,600,455 B2 | 10/2009 | Gass et al. | |
| 7,621,205 B2 | 11/2009 | Gass | |
| 7,628,101 B1 | 12/2009 | Knapp et al. | |
| 7,644,645 B2 | 1/2010 | Gass et al. | |
| 7,681,479 B2 | 3/2010 | Gass et al. | |
| 7,707,920 B2 | 5/2010 | Gass et al. | |
| 7,712,403 B2 | 5/2010 | Gass et al. | |
| 7,739,934 B2 | 6/2010 | Tetelbaum et al. | |
| 7,784,507 B2 | 8/2010 | Gass et al. | |
| 7,788,999 B2 | 9/2010 | Gass et al. | |
| 7,971,613 B2 * | 7/2011 | Gass et al. ................... | 144/382 |

(Continued)

OTHER PUBLICATIONS

Young Inventor: Teen's Device Earns Her Trip to Science Fair, *The Arizona Republic*, May 5, 2006.

(Continued)

*Primary Examiner* — Bena Miller

(57) ABSTRACT

Methods to detect when a human body contacts a predetermined portion of a machine are disclosed. The methods distinguish contact with a person from contact with other materials. The methods are particularly applicable in woodworking equipment such as table saws to distinguish contact between a person and the blade of the saw from contact between the blade and wet or green wood. The methods and woodworking equipment may include predictive blade stop algorithms that prevent unnecessary activations of a safety brake during coast down of a blade and continued protection in the event a main power switch is turned off.

11 Claims, 27 Drawing Sheets

U.S. PATENT DOCUMENTS

2003/0015253 A1 1/2003 Gass et al.
2003/0056853 A1 3/2003 Gass et al.
2005/0066784 A1 3/2005 Gass
2005/0155473 A1 7/2005 Gass
2009/0236012 A1 9/2009 Gass et al.

OTHER PUBLICATIONS

Operator Injury Mitigation Using Electronic Sensing and Mechanical Braking and Decoupling Devices in Handheld Circular Saws, Erin F. Eppard, believed to be from May 2006.

* cited by examiner

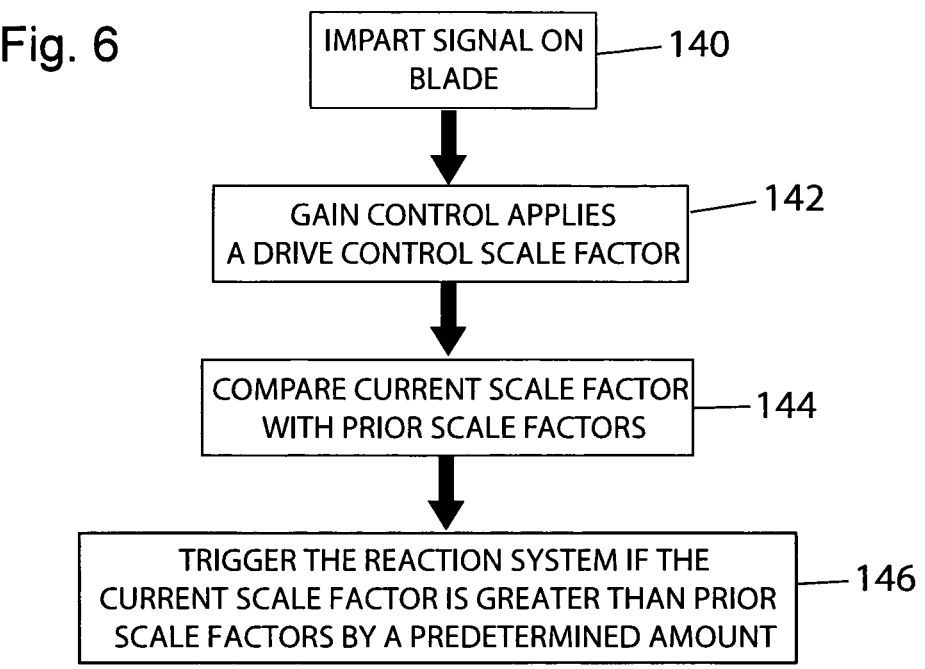

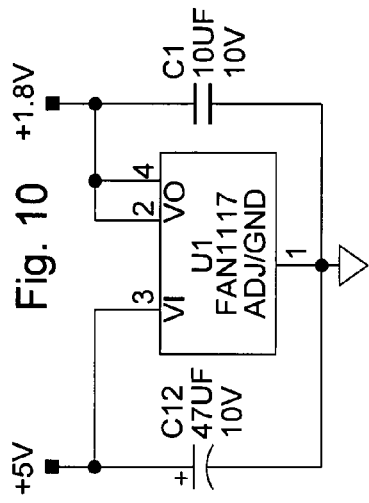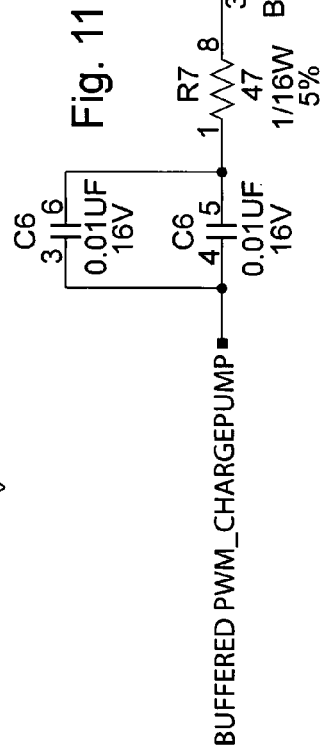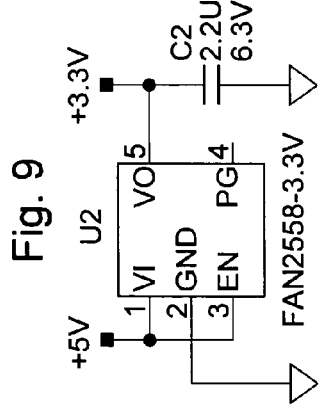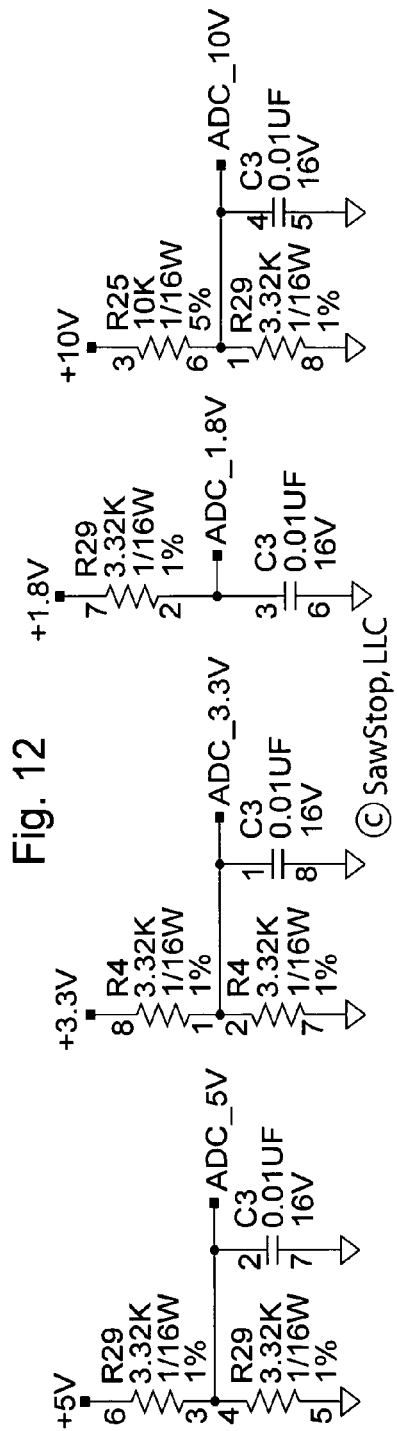

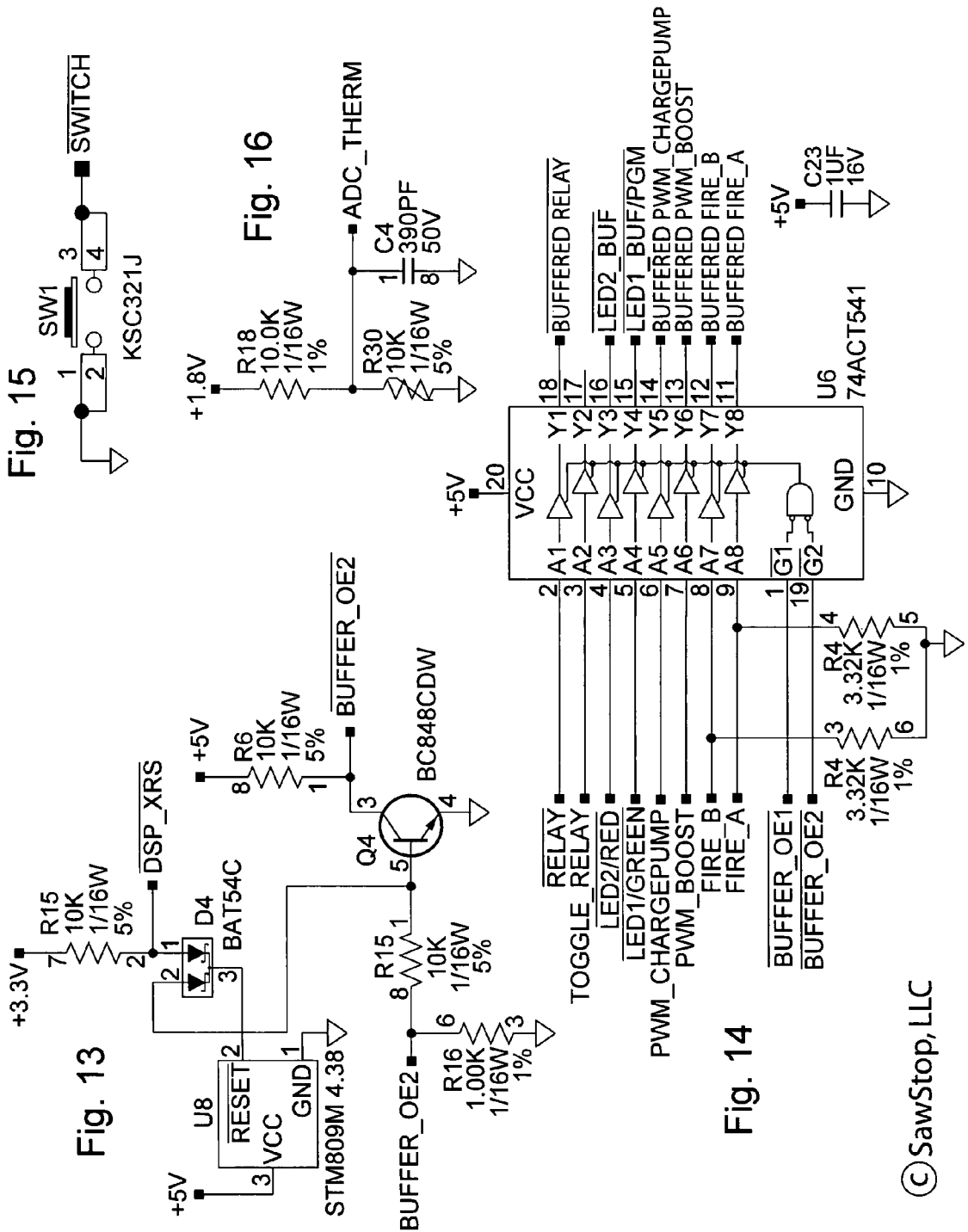

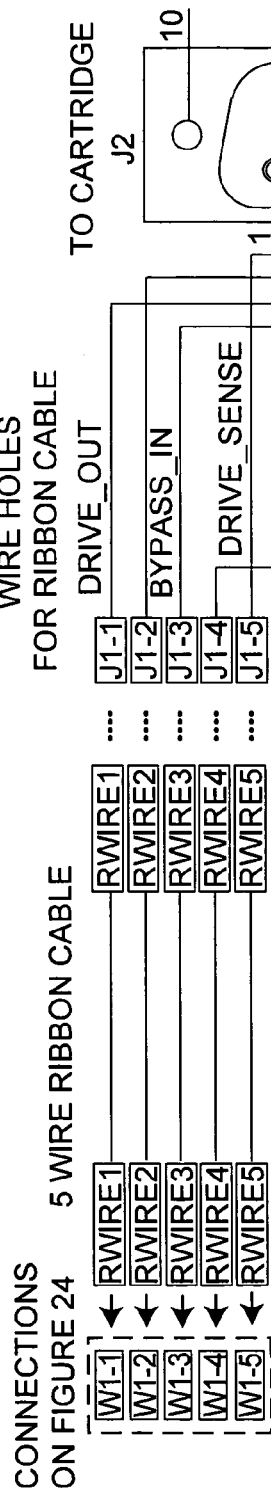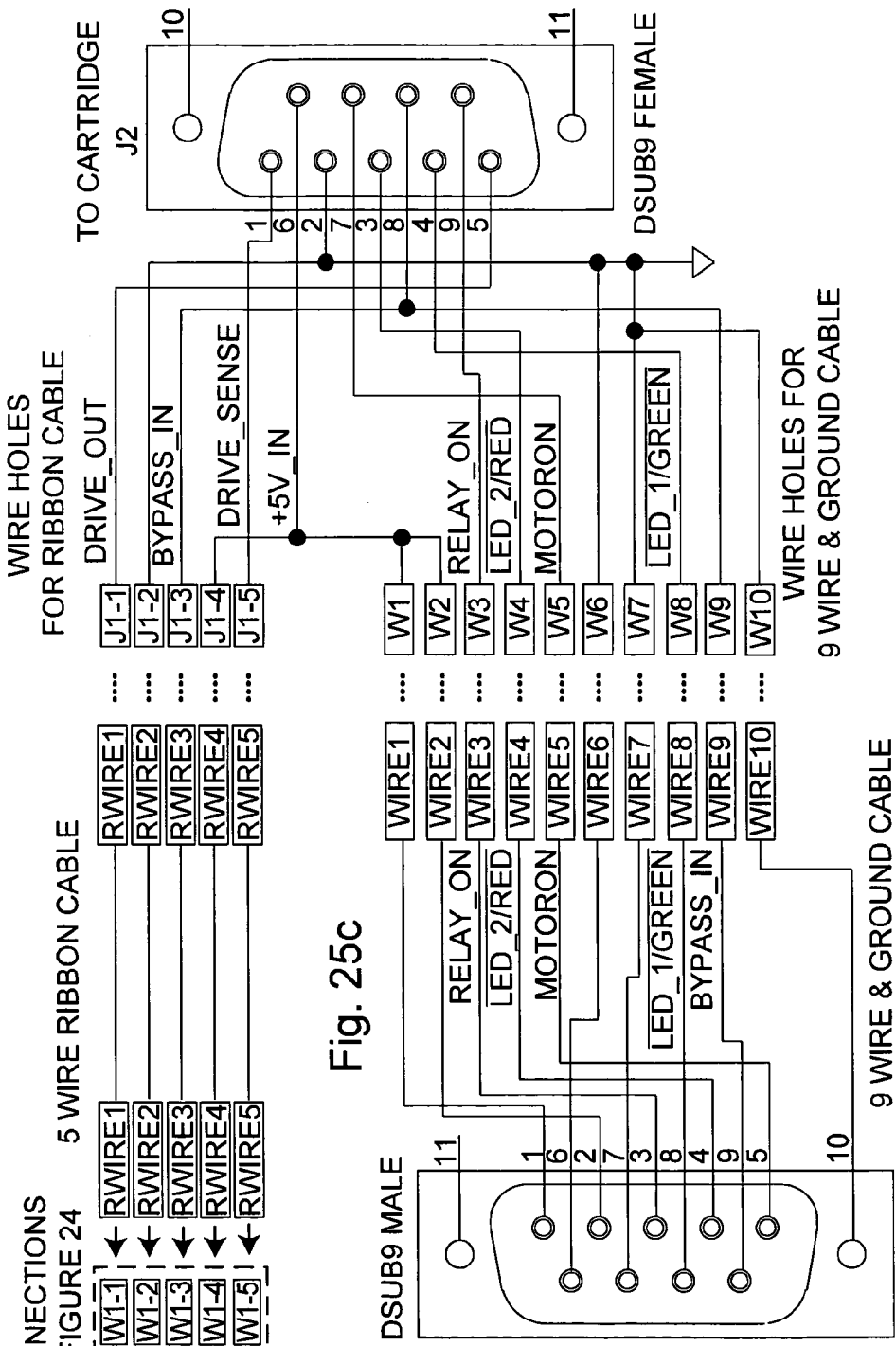
Fig. 25a
Fig. 25b
Fig. 25c

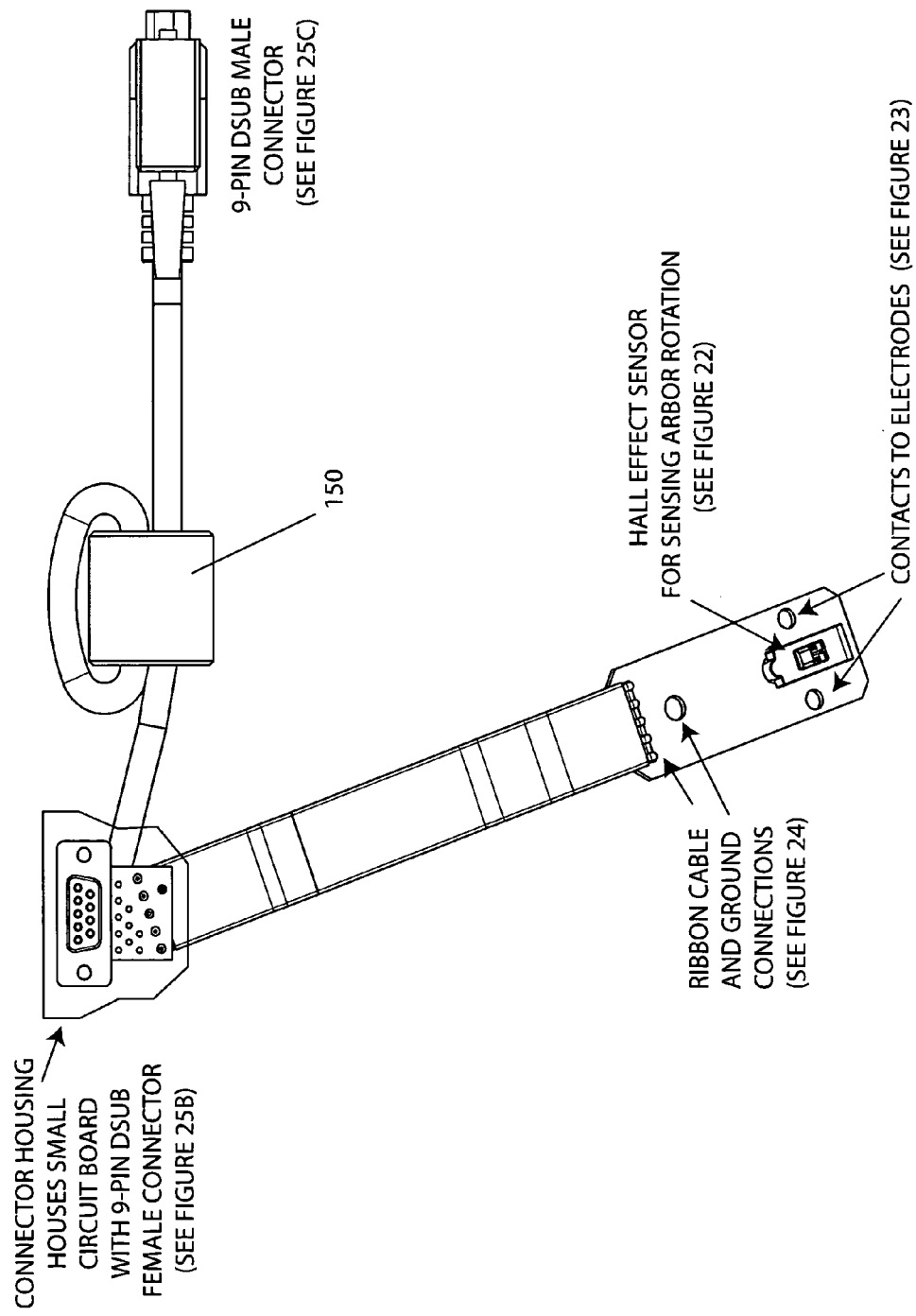

DETECTION SYSTEMS FOR POWER EQUIPMENT

CROSS-REFERENCE TO RELATED APPLICATION

This application is a continuation of U.S. patent application Ser. No. 12/319,213, filed Dec. 31, 2008, issuing as U.S. Pat. No. 7,971,613 on Jul. 5, 2011, which in turn claims the benefit of and priority from U.S. Provisional Patent Application Ser. No. 61/009,854, filed Dec. 31, 2007. The disclosures of those applications are herein incorporated by reference.

COMPUTER PROGRAM LISTING APPENDIX

Two compact discs, each containing a computer program listing that is one implementation of methods and systems described herein, are being submitted herewith as a Computer Program Listing Appendix. The compact discs are identified as "Copy 1" and "Copy 2" and they are identical. The program listing is stored on each compact disc as one ASCII text file entitled "program.asm". The date of creation of the file is Dec. 31, 2007, and the size of the file is 586K of bytes. The material on the compact discs is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to safety systems for power tools such as table saws, miter saws, band saws, hand-held circular saws, jointers, shapers, routers, up-cut saws, and other machinery. More particularly, the present invention relates to detecting contact between a human and a portion of a piece of power equipment.

BACKGROUND

Safety systems may be employed with power equipment to minimize the risk of injury when using the equipment. Some safety systems include an electronic system to detect the occurrence of a dangerous condition and a reaction system to minimize any possible injury from the dangerous condition. For instance, some safety systems attempt to detect when a human body contacts or comes into dangerous proximity to a predetermined portion of a machine, such as detecting when a user's hand touches the moving blade of a saw. When that dangerous condition is detected, the safety system reacts to minimize injury.

BRIEF DESCRIPTION OF THE DRAWINGS

FIG. 6 is a flowchart of still another method of detecting contact.

FIG. 9 is a diagram of a voltage regulator used to generate 3.3V from 5V.

FIG. 10 is a diagram of a voltage regulator used to generate 1.8V from 5V.

FIG. 11 is a diagram of a charge pump circuit used to generate 10V from 5V.

FIG. 12 is a diagram of a group of circuits which enable a microcontroller to monitor various voltages.

FIG. 13 is a diagram of a circuit used to hold the digital signal processing micro-controller shown in FIG. 7 in reset unless a power supply is at proper operating voltage.

FIG. 14 is a diagram of a buffer/line driver circuit.

FIG. 15 is a diagram of a switch that can be used by the digital signal processing microcontroller shown in FIG. 7 to detect the position of a mechanical device.

FIG. 16 is a diagram of a circuit with a thermistor which enables a microcontroller to monitor temperature.

FIG. 25a is a diagram of a 5-wire ribbon cable.

FIG. 25b is a diagram of a circuit board which interconnects a safety system cartridge to the cable assembly described in FIGS. 25a and 25c.

FIG. 25c is a diagram of a cable assembly which connects the circuit board described in FIG. 25b to the power module described in FIG. 31.

FIG. 26 is an illustration of the entire connector/cable assembly described in FIGS. 25a, 25b and 25c, along with the circuitry described in FIGS. 22, 23 and 24.

FIG. 27 is a diagram of a connector on a circuit board that connects to the cable assembly of FIG. 26 at the connector shown in FIG. 25c.

FIG. 28 is a diagram of a circuit for a switch that a user activates to signal a microcontroller to start and stop a motor.

FIG. 29 is a diagram of a circuit which connects to a user-operable switch to control the mode of the safety system.

FIG. 30 is a diagram of a circuit which connects to status indicator LEDs.

DETAILED DESCRIPTION

Figure 1:
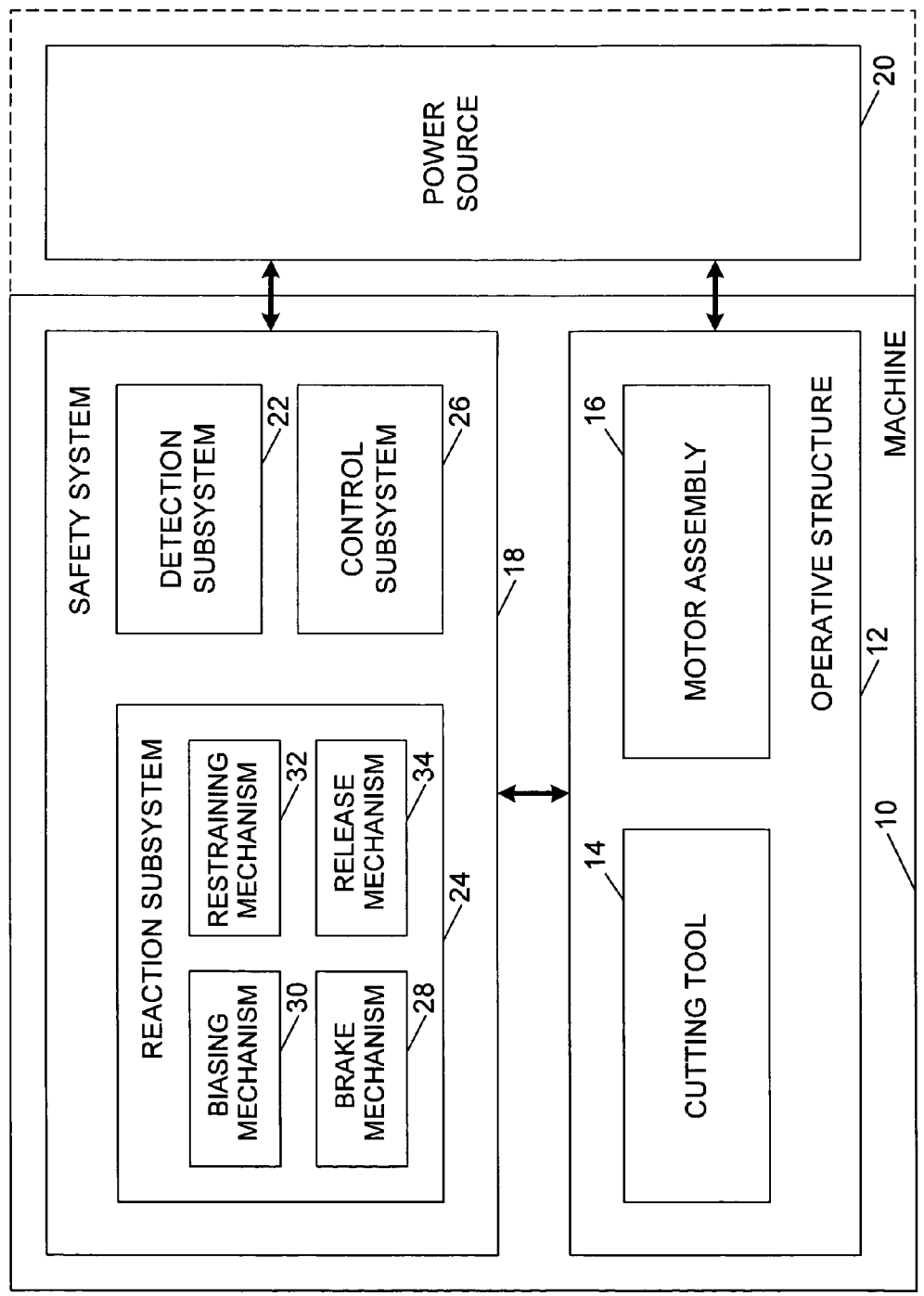
FIG. 1 is a schematic block diagram of a machine with a fast-acting safety system.

A machine that incorporates a safety system to detect and react to human contact with the machine is shown schematically in FIG. 1 and indicated generally at 10. Machine 10 may be any of a variety of different machines, such as table saws, miter saws, band saws, jointers, shapers, routers, hand-held circular saws, up-cut saws, sanders, etc. Machine 10 includes an operative structure 12 having a working or cutting tool 14 and a motor assembly 16 adapted to drive the cutting tool. Machine 10 also includes a safety system 18 configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. The particular form of cutting tool 14 will vary depending upon the various embodiments of machine 10. For example, cutting tool 14 may be a single, circular rotating blade having a plurality of teeth disposed along the perimetrical edge of the blade. Alternatively, the cutting tool may be a plurality of circular blades, such as a dado blade or dado stack, or some other type of blade or working tool.

Safety system 18 includes a detection subsystem 22, a reaction or danger mitigation subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous or triggering conditions during use of machine 10. For example, the detection subsystem may be configured to detect that a portion of the user's body is dangerously close to or in contact with a portion of cutting tool 14. As another example, the detection subsystem may be configured to detect the rapid movement of a workpiece due to kickback by the cutting tool, as is described in U.S. Pat. No. 7,055,417, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, disengage the motor from the cutting tool, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Pat. No. 6,920,814, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. Pat. No. 7,098,800, entitled "Retraction System and Motor Position for Use With Safety Systems for Power Equipment," the disclosures of which are herein incorporated by reference.

The configuration of reaction subsystem 24 typically will vary depending on which action or actions are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
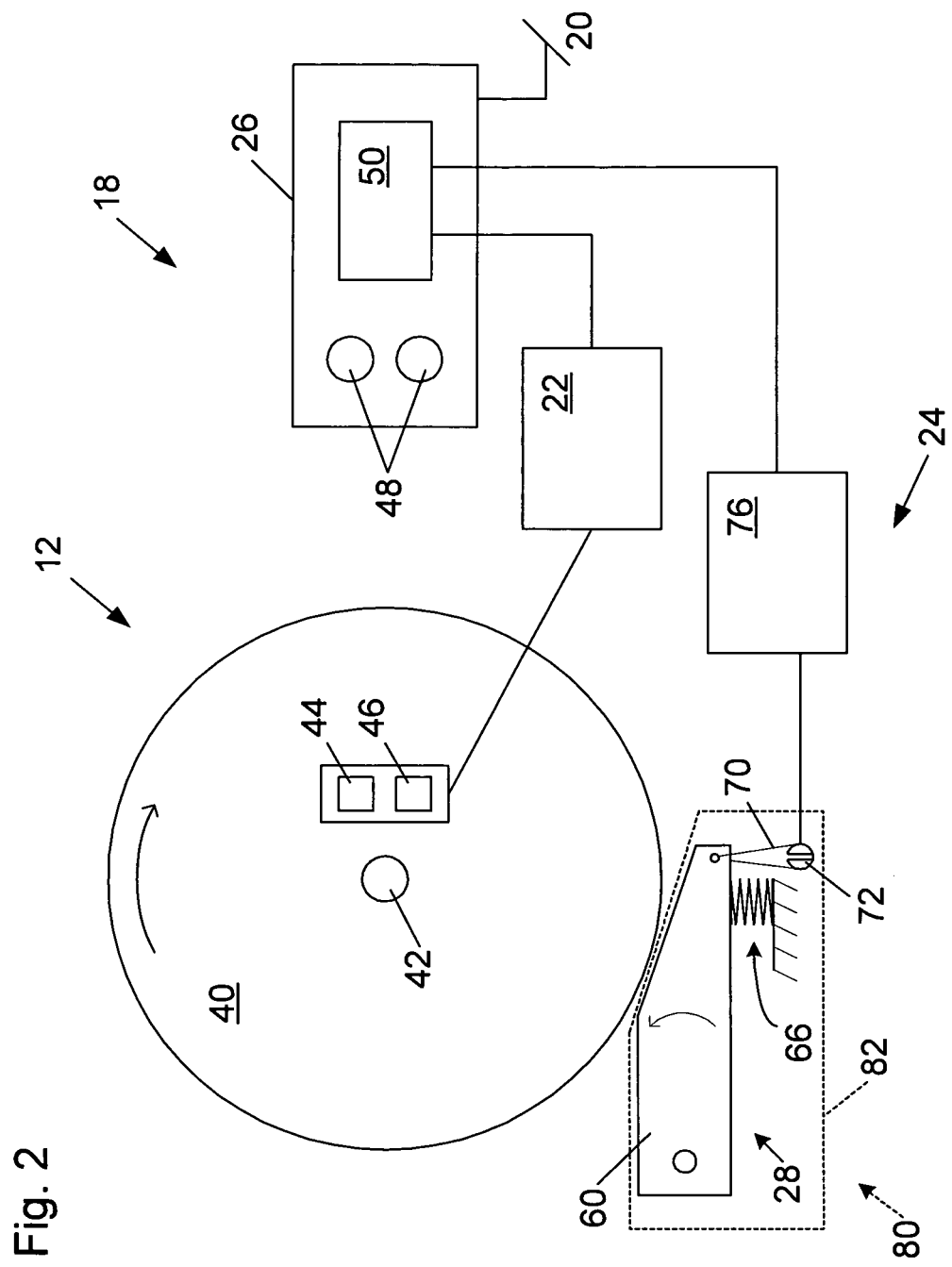
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Pat. No. 7,137,326, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Pat. No. 6,880,440, entitled "Miter Saw with Improved Safety System," U.S. Pat. No. 6,994,004, entitled "Table Saw With Improved Safety System," U.S. Pat. No. 6,826,988, entitled "Miter Saw With Improved Safety System," U.S. Pat. No. 6,945,148, entitled "Miter Saw With Improved Safety System," and U.S. Pat. No. 6,877,410, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Pat. No. 7,000,514, entitled "Safety Systems for Band Saws," U.S. Patent Application Publication No. 2003/0056853 A1, entitled "Router With Improved Safety System," U.S. Patent Application Publication No. 2004/0040426 A1, entitled "Miter Saw With Improved Safety System," U.S. Patent Application Publication No. 2005/0039822 A1, entitled "Woodworking Machines With Overmolded Arbors," and U.S. Patent Application Publication No. 2005/0139057 A1, entitled "Table Saws with Safety Systems," the disclosures of which are all herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Pat. No. 7,210,383, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Pat. No. 7,231,856, entitled "Apparatus and Method for Detecting Dangerous Conditions in Power Equipment," U.S. Pat. No. 7,171,879, entitled "Discrete Proximity Detection System," U.S. Pat. No. 7,077,039, entitled "Detection System for Power Equipment," U.S. Patent Application Publication No. 2005/0155473 A1, entitled "Detection Systems for Power Equipment," and U.S. Patent Application Publication No. 2006/0247795 A1, entitled "Detection Systems for Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26, and components that may be used in control system 26, are described in more detail in U.S. Patent Application Publication No. 2002/0020262 A1, entitled "Logic Control For Fast Acting Safety System," U.S. Pat. No. 7,225,712, entitled "Motion Detecting System For Use In Safety System For Power Equipment," U.S. Pat. No. 7,197,969, entitled "Logic Control With Test Mode for Fast-Acting Safety System," U.S. Patent Application Publication No. 2005/0041359 A1, entitled "Motion Detecting System for use in a Safety System for Power Equipment," and U.S. Provisional Patent Application Publication No. 2005/0139459 A1, entitled "Switch Box for Power Tools with Safety Systems," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as fully annealed aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl has to travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70; however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Pat. No. 7,100,483, entitled "Firing Subsystem For Use In A Fast-Acting Safety System," U.S. Patent Application Publication No. 2002/0020271 A1, entitled "Spring-Biased Brake Mechanism for Power Equipment," U.S. Pat. No. 7,024,975, entitled "Brake Mechanism For Power Equipment," U.S. Pat. No. 6,813,983, entitled "Power Saw With Improved Safety System," U.S. Pat. No. 6,957,601, entitled "Translation Stop For Use In Power Equipment," U.S. Patent Application Publication No. 2003/0005588 A1, entitled "Actuators For Use in Fast-Acting Safety Systems," and U.S. Pat. No. 6,945,149, entitled "Actuators For Use In Fast-Acting Safety Systems," the disclosures of which are all herein incorporated by reference.

Figure 3:
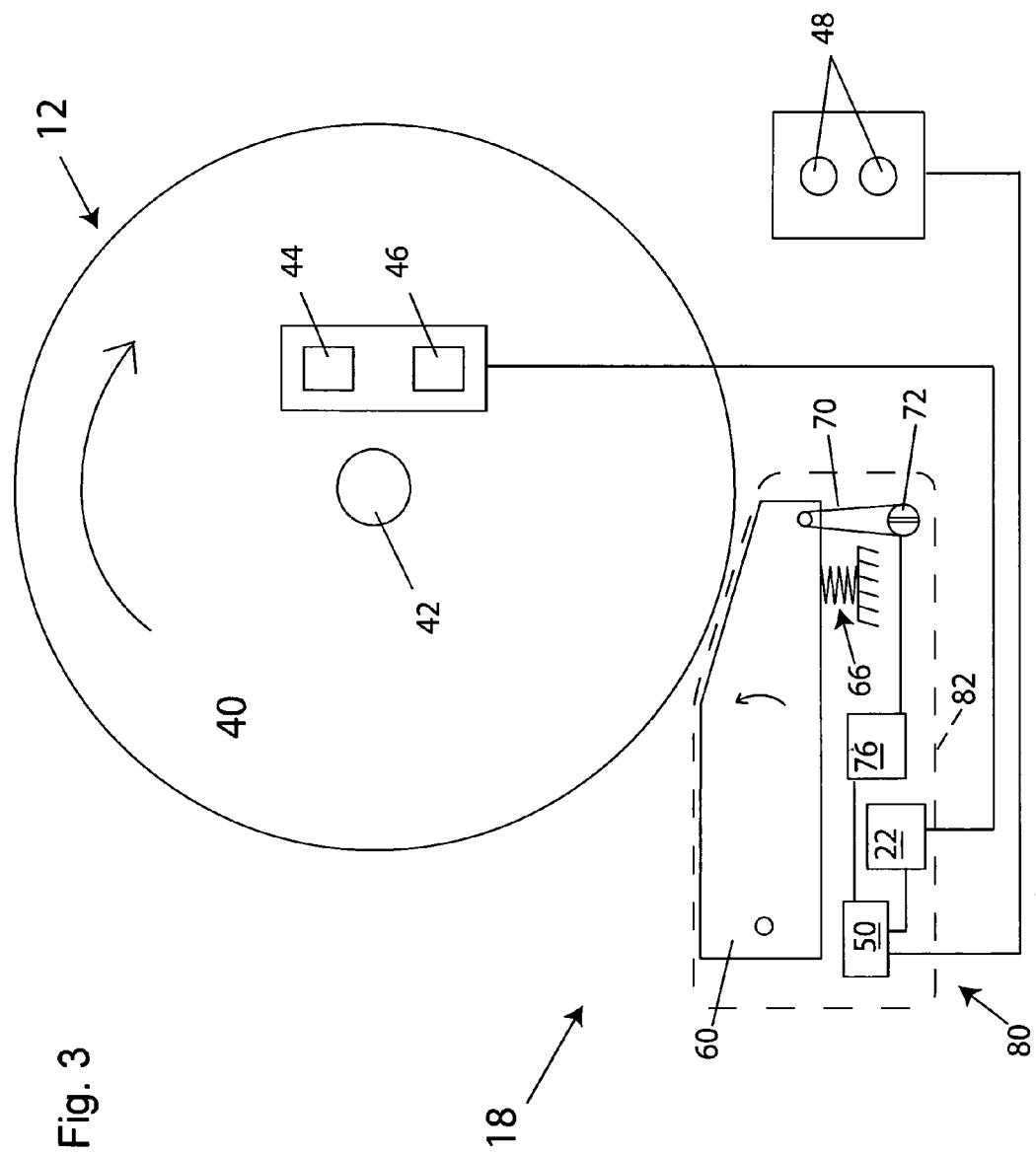
FIG. 3 is a schematic diagram of an alternative cartridge arrangement for an exemplary safety system in the context of a machine having a circular blade.

It will be appreciated that activation of the brake mechanism will require the replacement of one or more portions of safety system 18. For example, pawl 60 and fusible member 70 typically must be replaced before the safety system is ready to be used again. Pawl 60 engaging the blade and fusible member 70 melting may be thought of as examples of irreversible changes to at least a part of the machine. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. FIG. 3 illustrates an alternative arrangement of a replaceable cartridge 80. In this arrangement, pawl 60, spring 66, fusible member 70, release mechanism 76, microcontroller 50, and other portions of both detection subsystem 22 and control subsystem 26 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Pat. No. 6,857,345, entitled "Brake Positioning System," U.S. Patent Application Publication No. 2003/0140749 A1, entitled "Brake Pawls for Power Equipment," U.S. Patent Application Publication No. 2005/0039586 A1, entitled "Brake Cartridges for Power Equipment," and U.S. Patent Application Publication No. 2005/0139058 A1, entitled "Brake Cartridges and Mounting Systems for Brake Cartridges," the disclosures of which are all herein incorporated by reference.

While one particular implementation of safety system 18 has been described, it will be appreciated that many variations and modifications are possible. Many such variations and modifications are described in U.S. Patent Application Publication No. 2002/0170399 A1, entitled "Safety Systems for Power Equipment," U.S. Pat. No. 6,997,090, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

In some applications, detection subsystem 22 detects contact between a human and a predetermined portion of the machine and it is desirable to distinguish that contact from contact with other materials. For example, in a saw the detection subsystem may detect contact between a person and the blade and distinguish that contact from contact between the blade and other materials such as wet or green wood. It should also be understood that in many aspects of the inventions disclosed herein the dangerous condition detected could be dangerous proximity rather than actual contact, even though much of the disclosure is particularly directed to detecting actual contact.

Figure 4:
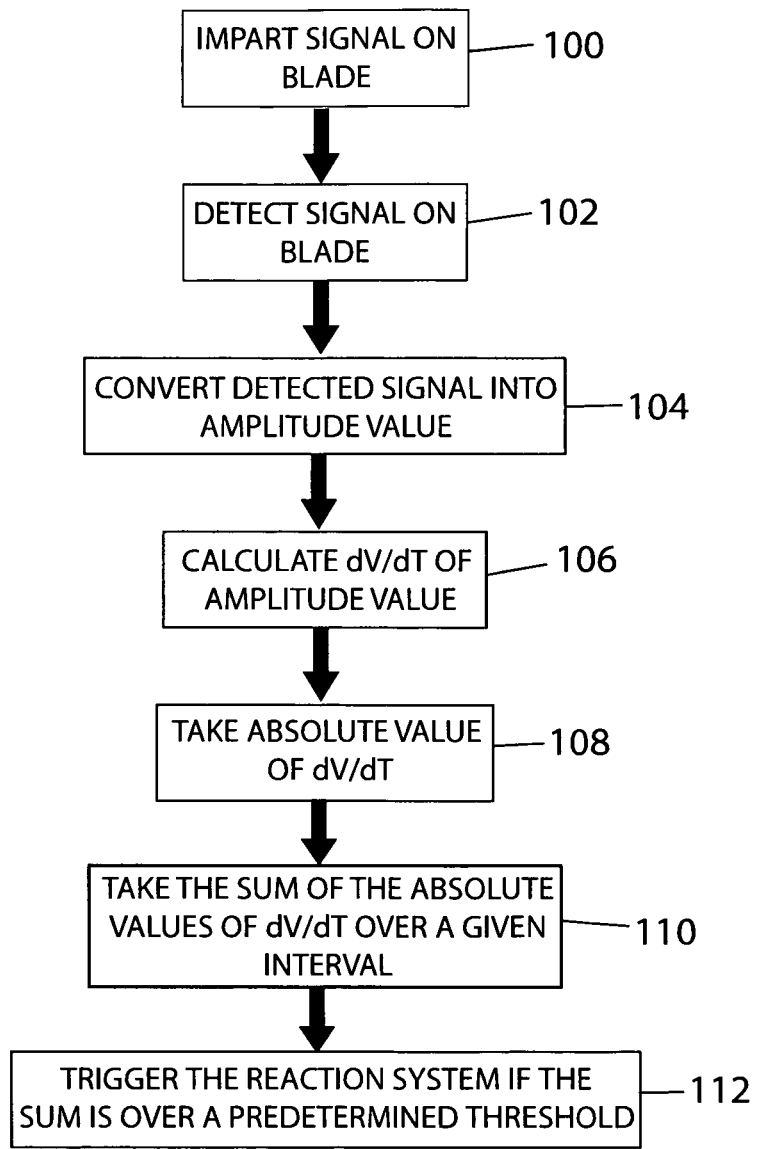
FIG. 4 is a flowchart of a method of detecting contact.

One method of distinguishing human contact from contact with other materials is shown generally in FIG. 4. First, as explained above, the electrical impedance of the blade is monitored, such as by inducing an electrical signal on the blade, which is represented by box 100 in FIG. 4. The electrical impedance of the blade can be monitored in a variety of ways, such as applying a fixed voltage to a drive electrode coupled to the blade and monitoring the voltage thereby induced on the blade. That voltage will drop as the apparent impedance of the blade drops. Alternatively, the amount of electrical current delivered to the blade for a fixed drive voltage can be monitored and this current would go up as the impedance of the blade dropped. However the impedance of the blade is measured or monitored, the detection system looks for changes at 102. Such changes in electrical impedance will occur when the blade cuts into or contacts a person. However, the electrical impedance may also change due to other circumstances, such as when the blade contacts other materials, especially wet or green wood, or when the signal is exposed to electrical noise. It is desirable to distinguish the change in the electrical impedance caused by human contact from changes in the impedance caused by other events; otherwise, the detection system may activate unnecessarily.

As one exemplary way to distinguish changes in the electrical impedance, the method converts the detected signal on the blade into values proportional to the peak-to-peak amplitude or RMS amplitude of the signal, as shown at 104. In one implementation, the method discretely converts the detected signal into amplitude values every 6 microseconds. Of course, other time periods could be used, such as every 2 to 10 microseconds or the conversion could even be done continuously. One way of converting the detected signal is to integrate the absolute value of the detected signal about its average value, resulting in a data point that is proportional to the peak-to-peak amplitude of the detected signal.

Integrating the signal has the benefit of averaging out the effect of noise on the signal, resulting in a data point that is relatively resistant to noise. For instance, it can be seen that if the signal used for contact detection has a frequency of 500 KHz, then three cycles of the signal will be integrated to generate the amplitude level. However, if there is a 10 MHz noise present, that noise will have relatively little effect on the measured amplitude value since it will be substantially averaged out over the course of the integration. Similarly, if there is a low frequency noise on the signal that shifts the apparent DC level of the 500 KHz signal somewhat, the absolute value integration will minimize the effect since one lobe of the sine wave will be increased by the DC shift and the following lobe will be lowered, with the overall effect of the DC offset on the measurement of amplitude being substantially reduced, although not entirely eliminated. In other words, integrating the signal can be seen as a noise reduction technique. It will of course be understood that numerous other techniques could be used to generate a value proportional to the amplitude of the signal, such as looking for the difference between the maximum and minimum values over some interval or even just looking for the peak value over some time interval.

Maximum single step clipping can also be used as an additional noise reduction technique. Actual contact events, i.e. where a blade contacts skin, typically only cause the signal to drop by a relatively small amount per sample—for instance, a few percent per sample. By examining the change from sample to sample and clipping the maximum change to a maximum permitted value, it is possible to obtain improved resistance to noise induced fluctuation on the detection signal.

It should be noted that although the system for detecting contact is described herein principally in terms of monitoring the amplitude of a signal on the blade, more generally, the system is monitoring the electrical impedance of the blade and the amplitude of the signal is just one measure of that impedance. The system could equally well be implemented with values proportional to other characteristics of the impedance, such as the phase of the signal on the blade, current delivered to the blade or any other variable related to the electrical impedance of the blade. In reading the description herein, it should be understood that the values tracked could be based on any variable related to the electrical impedance of the blade.

At the time of integration, the signal on the blade may have increased or decreased from an immediately prior integration, causing the value of the current data point to be larger or smaller than the value of the prior data point. The method compares the value of the current integrated data point to a previous integrated data point to see how the signal has changed, as shown at 106. This change is sometimes referred to as dV/dt or the change in value of the data point over time. This dV/dt value is typically referred to as a derivative or rate of change and is proportional to the rate of change of the amplitude of the signal on the blade. Again, this dV/dt value could be calculated or sampled at varying intervals from continuous to every 10 microseconds or longer depending on how fast relevant changes in the signal properties may occur.

In order to generate a value proportional to the cumulative or persistent rate of change of the signal over some time interval, the method takes the absolute value of dV/dt at 108, and then sequentially adds together a given number of such absolute values at 110. For example, the method may sum the prior 16 data points, which means that if the method obtains a new data point every 6 microseconds, then the method will look at a window of 96 microseconds. If the sum of the dV/dt values during that window is greater than a predetermined threshold value, then the detection system concludes that the blade has contacted a person and the detection system will trigger the reaction system. The predetermined threshold value is set empirically based on experimentation and observed test results and is dependent on the electrical impedance of the blade and the various materials to be distinguished, as well as the characteristics of the way the signal is induced on and detected from the blade. The sum of the absolute values of dV/dt of these 16 data points may be referred to as a short sum. It should be understood that it is not necessary to take the absolute value of the signal, but rather just the sum of the dV/dt values could be computed, although it is believed that summing the absolute value of the dV/dt values provides better discrimination of human contact events from other effects that can change the signal on the blade. Whether the absolute value or unmodified values are summed, this scheme can be seen as looking at the accumulated time properties of a data stream related to the electrical impedance of the blade, in distinction to just looking at an instantaneous value, such as the instantaneous rate of change.

The method preferably repeats continuously while the machine is functioning. Typically the method will repeat for each new data point. Thus, if a new data point is integrated every 6 microseconds then the method would repeat every 6 microseconds. As the method repeats, the newest absolute value of dV/dt replaces the oldest such value in the sum so that the window of time the short sum covers is continuously moving or sliding forward. In terms of processing, this can be accomplished by storing the short sum in memory and adding to that sum each new data point while subtracting from that sum the oldest data point. Alternatively, if the integration is done continuously, such as by an analog integrator with a decay time constant, the dV/dt sum could likewise be generated by feeding an electrical signal proportional to the dV/dt into another analog integrator with a fixed decay time constant to generate a signal proportional the running sum of dV/dt values.

This method is particularly applicable for machines using blades with relatively coarse teeth and significant gullets between the teeth, such as a 28-tooth circular blade with a diameter of 10 inches, where typically one tooth at a time would contact a person in an accident. This method has been found to distinguish contact between a person and such a blade from contact between wet or green wood and the blade because when the tooth of the spinning blade contacts a person and begins to cut into the skin, the signal on the blade will drop quickly due to the sudden connection of the human body's inherent capacitance via the conductive contact between the tooth and the person. Similarly, the signal will rise sharply when the tooth breaks contact with the person. The length of the short sum is typically adjusted to cover the typical time interval that a tooth would be in contact with a finger so that it sums both the dV/dts generated by the drop in signal when the tooth comes into contact with the finger and the dV/dts generated by the rise in signal when the tooth leaves the finger. It has been observed with a particular signal coupling to and from the blade that the signal on the blade typically drops in the range of 15-30%. When the tooth moves out of contact with the body, the signal will go up a corresponding amount. The method will detect and monitor how the signal amplitude changes, and add the changes together to arrive at the short sum, as described. In contrast, when the tooth of a blade cuts into wet or green wood, for example, or when the tooth moves out of contact with wet or green wood, it has been observed that the change in the signal is not as sudden even though the total amplitude change of the signal over time may be similar to the amplitude changes seen when contacting a person. Thus, the sum of dV/dt values resulting from contact with a person is typically greater than the sum of such values resulting from contact with wet or green wood over the period observed by the short sum.

As explained above, one implementation of the short sum method sums the 16 most recent dV/dt values, resulting in a 96 microsecond window. That window corresponds roughly to the time it takes one tooth on a 10 inch blade spinning at 4000 rpm to move into and out of contact with a finger in what is believed to be a typical accident scenario. It has been observed from experiments conducted with a hot dog acting as a finger, and from data collected during actual instances of a finger or hand touching the spinning blade of a table saw, that the sum of dV/dt values for hot dog and finger or hand contact is typically significantly greater than the sum of dV/dt values for wet or green wood contact. The threshold at which the sum of the dV/dt values will trigger the reaction system will be set empirically to optimize the performance of the method in any given machine. As a starting point, the threshold may be set at 30% of the baseline integrated data value, or in other words, the normal value if nothing is touching the blade.

Using a window of roughly 96 to 100 microseconds to look at the short sum allows the method to focus on changes in the signal rather than on the amplitude of the signal itself. This is useful when cutting wet or green wood, especially wet plywood, wet particle board, or other glued wood products. Those types of materials can create a dielectric effect by being adjacent the blade and the dielectric effect may cause the amplitude of the signal to change in proportion to the amount of material around the blade. Thus, looking simply at the amplitude of the signal may in some cases result in the detection system determining that the blade has contacted a person when in reality it has contacted wet or green wood. The rate of change of the signal, however, is typically more gradual when cutting wet or green wood than it is when the blade contacts a person, especially when accumulated over a period of time rather than looked at instantaneously, so the dV/dt values are different and the cumulative sum of the absolute values of dV/dt values over an appropriately selected interval allows the detection system to differentiate those contacts.

The method disclosed in FIG. 4 may also be adapted for blades with relatively fine teeth, where typically more than one tooth at a time would contact a person in an accident, such as with a 200-tooth plywood blade. With such a blade, it has been observed that the overall amplitude of the signal will drop both when cutting into a person and when cutting into wet or green wood, especially wet, glued wood. However, the overall drop in amplitude will be accompanied by many sudden and frequent changes when cutting into a person because of the number and nature of teeth contacting the person's body. When cutting into wet or green wood the overall drop in amplitude is accomplished by a relatively smoother decline. Thus, the accumulated dV/dt values over time when cutting into a person with a fine tooth blade will be greater than when cutting into wet or green wood. With this in mind, the method disclosed in FIG. 4 may be adapted so that the sum of the absolute values of dV/dt is taken over a longer interval, and this sum may be referred to as the long sum. The window or number of data points summed by the long sum may be chosen to correspond to the approximate time for one tooth and one gullet on a coarse-toothed blade (e.g. a 28-tooth blade) to move past a given point. Such a window would be approximately 300-750 microseconds, or around 50-125 data points and more preferably around 70-90 data points sampled at intervals of 6 microseconds. The window is preferably chosen so that at least one complete period of tooth strikes would be included in the window, even on a coarse toothed blade. This effectively averages the rate of change of the signal over the time period of a single tooth when cutting with a coarse tooth blade. This long sum is most responsive to the presence of many smaller fluctuations in the signal, such as occur when many small teeth are contacting a finger versus a single large dip in the signal seen with coarser blades.

Typically the detection system will include both the short and long sums operating in parallel, and the system will trigger the reaction system if either sum exceeds its predetermined threshold. In other words, the detection system will sum the absolute values of dV/dt for the first 16 data points and determine whether that short sum is greater than a first threshold. The method will also sum the absolute values of dV/dt for roughly the last 80 data points, and determine whether that long sum is greater than a second threshold. If either threshold is met or exceeded, then the method will trigger the reaction system. If not, the method repeats for each new data point.

Thinking of the method in terms of processing in a DSP or microcontroller implementation, the processor will store running totals for the short and long sums. Each time a new data point is calculated, the method will add that data point to each of the running sums and subtract the oldest data point. If either sum ever meets or exceeds its respective threshold, then the method will trigger the reaction system. It should be understood that the method does not need to trigger the reaction system in response to a single sum being over the threshold. It may also be desirable to require some number of sequential sums to be over a threshold value or for some proportion of recent sum values to be over a threshold value. In addition, it is possible to have the triggering of the reaction system be based on how much the sums exceed the threshold value. For instance, exceeding the threshold value by 50% may cause an immediate trigger, whereas the system may require three consecutive values over the threshold if the values exceed the threshold by only 1%.

Figure 5:
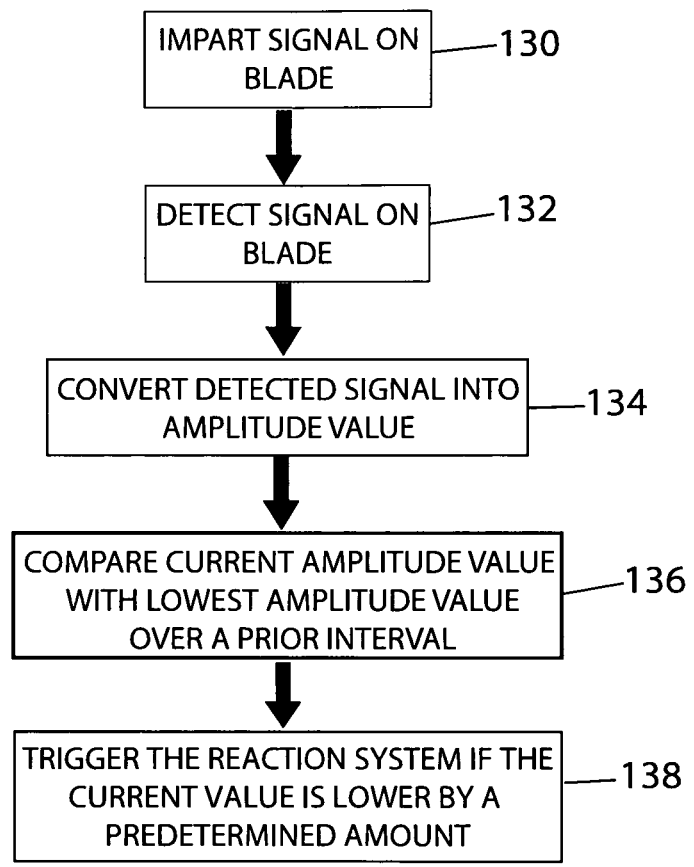
FIG. 5 is a flowchart of another method of detecting contact.

Detection subsystem 22 may also implement a third method of detecting contact between a blade and a person. This third method is represented generally in FIG. 5 and may be referred to as a method for detecting a relatively slow drop or falloff in the electrical impedance of the blade. First, a signal is imparted to a designated portion of a machine, such as to the blade of a table saw, as shown at 130. The method then detects the signal at 132 and converts the signal into an integer proportional to the amplitude value at 134. The method then checks to see if the amplitude value is lower by a predetermined amount than any amplitude value during a designated prior interval of time, as shown at 136. If it is, then the method triggers the reaction system, as shown at 138. As discussed previously, it is not necessary to look at the amplitude of the signal on the blade; any other electrical signal property related to the electrical impedance of the blade could equally be used.

In one embodiment, every 6 microseconds (or some other predetermined time interval) the method detects the signal on the blade and converts the signal into an amplitude value. Every 768 microseconds the method will collect 128 amplitude values (one value every 6 microseconds) and store the lowest value in a bin. A predetermined number of bins will be used to store the low values over successive periods of time. For example, the method may employ ten bins numbered 1 through 10, with bin 1 storing the lowest amplitude value over the 768 microsecond interval from time $t_0$ to $t_1$, bin 2 storing the lowest amplitude value from the next time interval $t_1$ to $t_2$, bin 3 storing the lowest amplitude value from time $t_2$ to $t_3$, and so forth with bin 10 storing the most recent lowest amplitude value from time $t_9$ to $t_{10}$. The method will then compare the current amplitude value with the values in a prior interval, such as in bins 1 through 5. If the current amplitude value is lower than the lowest amplitude value in bins 1 through 5 by a predetermined amount, such as 15-30%, then the method will trigger the reaction system.

The method compares the current value with a prior, non-adjacent interval of time in order to be able to detect when a person comes into contact with the blade relatively slowly. If a person moves into contact with the blade slowly, the signal will falloff but the drop could be relatively gradual. In that case, the lowest amplitude value in relation to the most recent bin may not be sufficiently different to trigger the reaction system. By comparing the current amplitude signal with a prior, non-adjacent time interval, the method is better able to detect more gradual drops in the signal. Thus, the method may compare the current amplitude signal with those in bins 1 through 5 rather than the more recent values stored in bins 6 through 10. Each new amplitude value is compared with the signals from a prior interval, and the amplitude values for the prior interval are updated as new amplitudes are calculated. For example, using the intervals and bins discussed above, every 768 microseconds the value in bin 1 is discarded, the values in bins 2 through 10 are shifted to bins 1 through 9, and a new value is added to bin 10. If the current amplitude value is lower than the lowest amplitude value against which it is compared by a predetermined threshold or amount, then the method will trigger the reaction system, as explained. The threshold amount and the desired time interval are empirically determined through experimentation and observation. It is believed that one appropriate threshold is roughly 15% to 30% lower than the low values expected during typical operation of the machine. It is believed that one suitable interval is roughly 5 milliseconds, ending approximately 5 milliseconds before the time the current amplitude value is determined for a saw blade spinning at 4000 rpm.

Some detection subsystems may include a gain control to maintain the signal on the blade at a desired amplitude. If the signal on the blade drops for whatever reason, including if the signal drops because a person contacted the blade, then the gain control tries to raise the signal to maintain a target level of the signal on the blade. If the signal on the blade is higher than the desired amplitude, then the gain control tries to lower the signal. Watching the gain control for instances when it tries to raise the signal on the blade can serve as the basis for a fourth method of detecting contact.

FIG. 6 shows an embodiment of this fourth method of detecting contact. First, a signal is imparted to a designated portion of a machine, such as to the blade of a table saw, as shown at 140. A gain control tries to maintain that signal by periodically sampling the signal and applying a drive control scale factor to adjust the signal when necessary, as represented at 142. The method compares the most current drive control scale factor with prior drive control scale factors to see if the current factor has changed, as shown at 144. If the factor has increased by more than a predetermined threshold, then the method triggers the reaction system, as shown at 146.

In one implementation, the gain control produces a drive control scale factor four times during every 768 microsecond interval, and the method compares the most current drive control scale factor to one of the drive control scale factors from each 768 microsecond interval during the immediately prior 5 milliseconds. The system is preferably configured to have different thresholds for different historical values of the drive control scale factor. Specifically, older historical values of the drive control scale factor would be larger than for the more recent values. Thus, the threshold for the difference between the current value and the historical value from 2 milliseconds ago may be 1.8 times as large as the threshold for the change from 1 millisecond ago. The predetermined thresholds at which the method will trigger the reaction system may be set empirically. This detection method is particularly applicable for situations where the gain control may otherwise mask a drop in amplitude caused by a finger briefly contacting the side of a blade.

It should be noted that the threshold values for some or all of the above contact detection schemes may be scaled based on operational parameters or conditions experienced by the system. For instance, it may be desirable to scale down one or more of the long sum, short sum and falloff thresholds as the automated gain control (AGC) increases the drive level. If the threshold values are scaled down inversely proportional to the drive level—i.e. if the drive level is doubled by the AGC, then the thresholds would be reduced by a factor of two—then the relative sensitivity of the system to detection of contact will be maintained relatively constant even when cutting wet wood, which would otherwise reduce the sensitivity of contact detection.

It may also be desirable to scale the thresholds at a level that is less than inversely proportional to the drive signal to cause the contact detection sensitivity to adjust to only partially compensate for the inherent change in sensitivity that would otherwise occur when cutting wet wood. Reducing or adjusting the sensitivity based on the apparent electrical impedance of the blade may be desirable to increase the resistance of the system to an unnecessary activation of the brake while cutting wet wood.

Alternatively, if no AGC is used, the automatic adjustment of threshold values could be implemented by scaling down the thresholds proportional to the average value of the signal detected on the blade. Under this scenario, as wet wood decreased the apparent impedance of the blade, thereby causing the amplitude of the signal on the blade to drop with a constant drive signal, the thresholds would scale down correspondingly to maintain a relatively constant threshold sensitivity. In either case, it should be understood that scaling the sensitivity could be implemented by directly adjusting the numerical value of the sensitivity or by making a corresponding adjustment to scale the signal level by a corresponding amount. By way of example, it is roughly equivalent to either divide the threshold value by two or multiply each dV/dt value by two prior to adding them to the sum.

In addition to scaling the threshold values to maintain a relatively constant sensitivity, under some circumstances it may be desirable to scale the sensitivity of the system based on the noise currently being experienced by the system. For instance, if the noise level is high, but below the threshold to be detected as contact, the threshold for registering contact can be raised to increase the resistance to an unnecessary activation of the brake from such noise. Then, when the noise level is lower, the thresholds can be lowered to thereby improve the sensitivity to contact. By way of example, the threshold for detecting contact with the long sum technique may include a term that is proportional to the recent values of the long sum. More specifically, for instance, the long sum threshold could be set adaptively to be equal to one half of a nominal non-adaptive threshold plus one half of the average value of the long sum over the last 5 milliseconds. In this way, the sensitivity when noise levels are low, as evidenced by a low average value for recent long sums, will be higher while maintaining good resistance to unnecessary activations of the brake when noise is higher, such as when cutting wet wood.

The above described types of adjustment of the contact detection threshold or sensitivity can be described as an active or adaptive sensitivity contact detection system since the sensitivity is adaptive to the current conditions experienced by the system. Various portions of this adaptive sensitivity contact detection system are illustrated and embodied in the attached code.

In addition to scaling the thresholds, the various detection schemes are monitored so that if a background noise level causes the detection schemes to reach a level close to but not exceeding the trigger level, the system will shut off the saw without triggering the braking system to warn the user that an activation of the brake is imminent. One way in which monitoring may be accomplished is to look at the response of a detection scheme averaged over a long enough time scale that single events will not have any significant effect on the average. This averaging can be accomplished easily in a microcontroller by use of a so-called infinite impulse response or IIR filter, as is shown in the code. The word average is used herein in a more general sense than just the mathematically defined average and is thus meant more to convey a measure of the characteristic level of a signal over a period of time, such as by the just-described IIR. Whatever way the monitoring is accomplished, it can be seen that tracking the response level of one or more of the detection schemes during operation and interrupting operation if the tracked response level exceeds some threshold less than the contact detection threshold, provides a method of reducing the chance of an unnecessary activation of the brake.

Two or more of the four methods disclosed above (ie. short sum, long sum, falloff, and gain control) may be implemented together in one detection subsystem. Implementing two or more methods improves the likelihood of detecting contact between a person and a designated portion of a machine in a variety of accident scenarios. It also improves the ability of a detection subsystem to distinguish contact between a person and the blade from contact between the blade and other materials such as wet or green wood. If any one of the implemented methods detects a contact, then the detection subsystem would trigger the reaction system to minimize any potential injury. It should also be understood that the detection subsystem could look for a particular pattern or combination of over-threshold values from one or more of the different methods to further enhance the resistance to non-body contact induced activations of the reaction subsystem.

The parallel operation of two or more detection systems, as described above, can be described as a multifaceted contact detection system. It should be noted that the so-called parallel or multifaceted operation does not require simultaneous execution on a microprocessor instruction level, although that could be possible with some processors. Rather, the parallel or multifaceted operation looks at the data associated with a single contact event in different ways, even though the data analyzed by each detection scheme could be different. For instance, one scheme could be looking at the phase of the signal on the blade and the other could be looking at the voltage characteristics. Therefore, the computations associated with determining contact may be carried out sequentially for each scheme one after the other or partially interspersed.

In the case where the thresholds in the different schemes are interdependent in some way, such as where the falloff threshold is scaled based on the recent values of the long sum, the multiple parallel detection schemes can be described as being selectively interrelated in that the output of one scheme is dependent on the operation of the other scheme or schemes.

It is important to again emphasize that although the methods described above have been discussed primarily in terms of amplitudes of a signal on a blade or of a drive control scale factor, the methods also can be implemented by looking at other aspects of the signal or the gain control. More generally, as stated, the methods are monitoring the electrical impedance of the blade, and the amplitude of the signal and the drive control scale factor are related to that impedance. The methods could be implemented with values related or proportional to other characteristics of the impedance, such as the phase of the signal on the blade or the gain control, current delivered to the blade, or any other variable related to the electrical impedance of the blade.

In the event of a contact event, it is possible to store some or all of the data associated with that contact event to a permanent memory, such as flash. This flash could be either built into the DSP or an external chip. Whatever type of permanent memory device is provided, it could be implemented inside the cartridge or as some other part of the electrical system connected to the cartridge and could be permanently installed in the cartridge or elsewhere on the machine or implemented as a removable component. Generally speaking, it is desirable to move the data currently stored in RAM to the flash so that the data can be subsequently downloaded to provide a picture of the status of the system at the time contact was registered and thereby provide information on what caused the contact event. By having users return or provide access to the data stored in the fired cartridges or other element, it is possible to download and analyze the stored data. A method is thereby provided of acquiring data of actual human contact events, which is not otherwise feasible to acquire due to the injury that results from contact. In addition, if the operator reports that no contact occurred, being able to look at the historical values stored in RAM provides some information on what might have caused an unnecessary activation so that corrective action can be taken. Thus, the described system can provide information on the cause of unnecessary activations or activations due to actual contact events.

The attached code illustrates the capability of storing the data that lead to a contact detection event to flash memory and reading that data back via a serial port after a fire event. Among the data tracked and stored is the power on time, the number of power cycles of the motor that have occurred since power was applied to the circuit and how long the motor had been running when the fire event occurred. Tracking these state conditions further facilitates diagnosis of actual or unnecessary fire events.

The methods discussed above may be implemented in power equipment in numerous ways through a combination of hardware, firmware and/or software. In saws, it is often desirable to incorporate the hardware, firmware and/or software into a replaceable brake cartridge, such as cartridge 80 discussed above. By so doing, the hardware, firmware and/or software may be revised or updated simply by changing the cartridge.

Figure 7A:
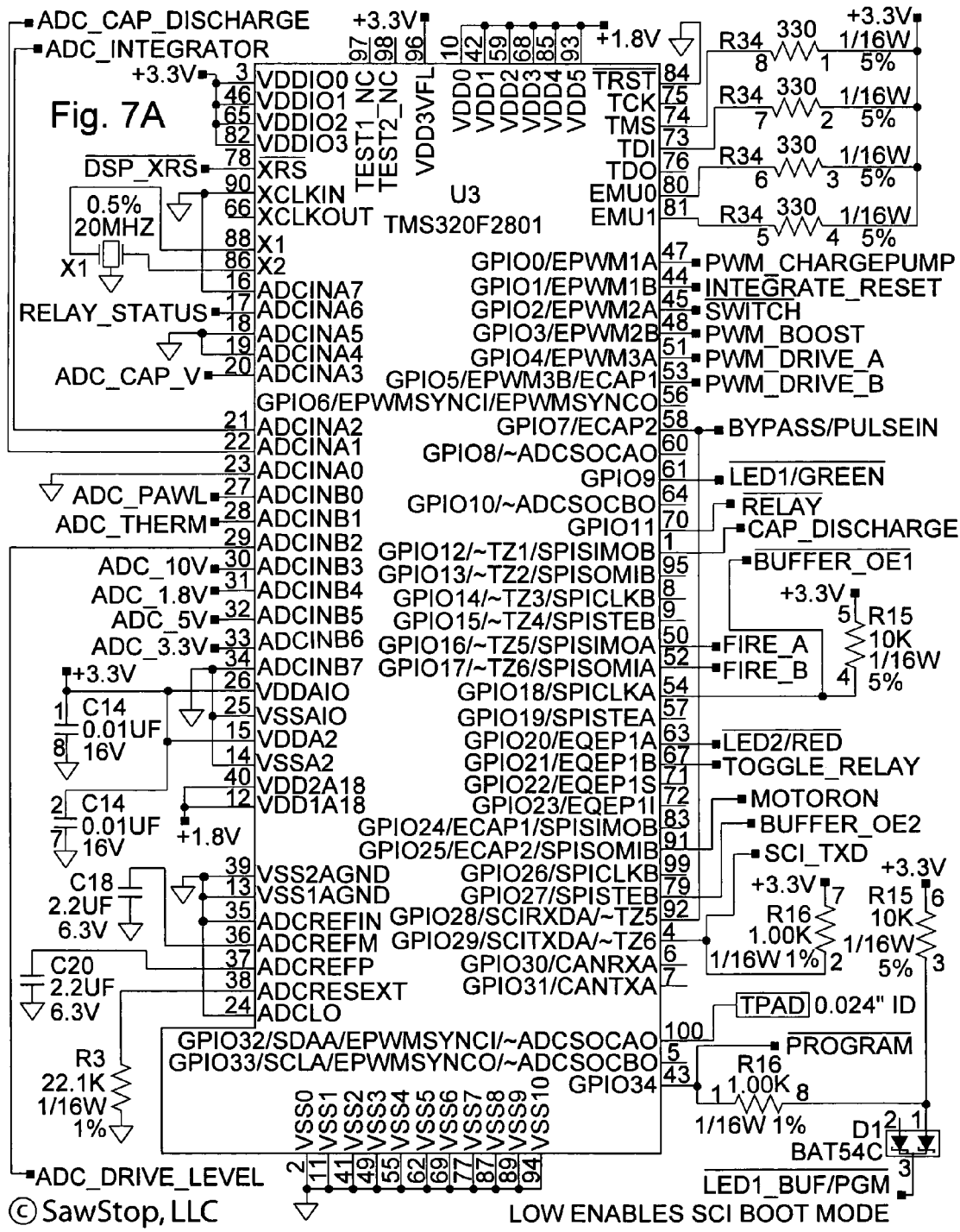
FIG. 7 is a diagram of a digital signal processing (DSP) microcontroller used to control the circuits described herein.
Figure 7B:
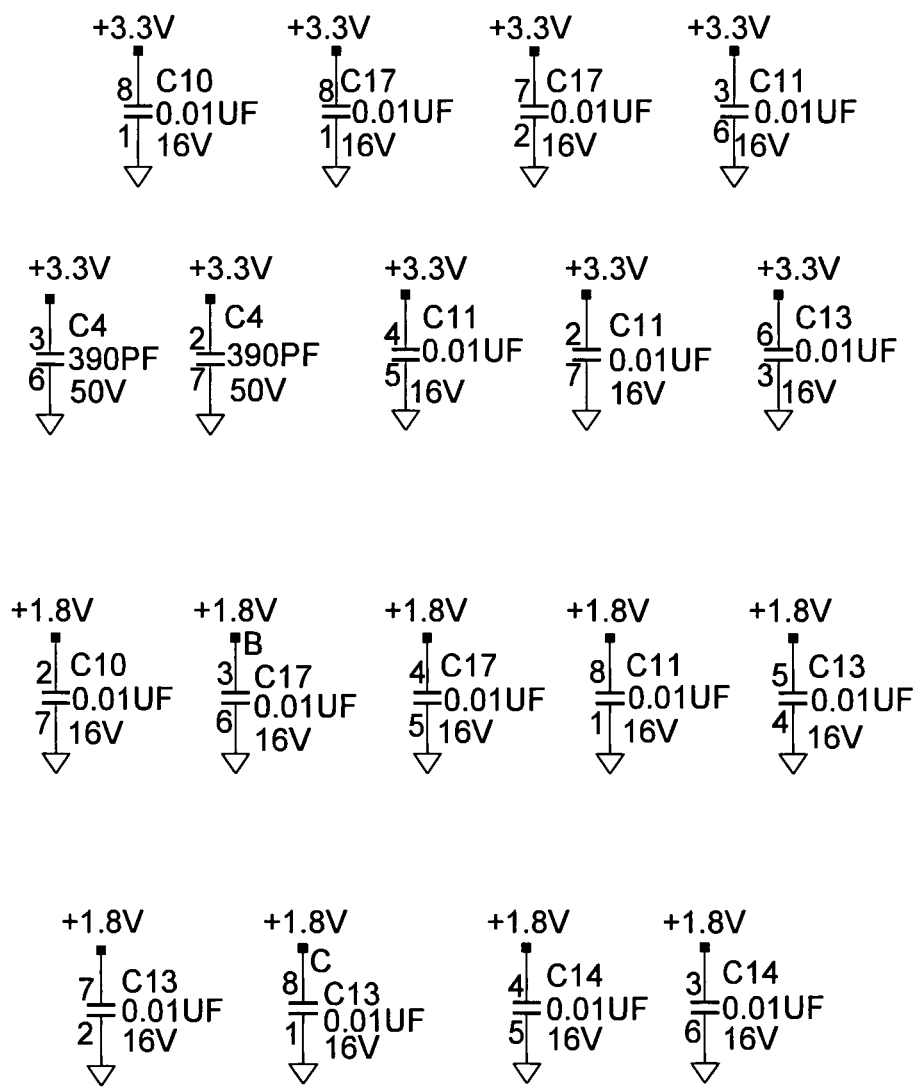

Typically, the methods described above will be implemented through the use of a digital signal processing (DSP) microcontroller that may be housed in a brake cartridge. FIG. 7 shows one example of a DSP microcontroller that may be used to control the circuits described herein. Circuitry and connections that may be used to implement the DSP in table saws is shown in FIGS. 7 through 35.

The DSP in FIG. 7 includes a multi-channel, internal, analog-to-digital converter (ADC) input, internal pulse-width modulator (PWM) outputs, event capture inputs, serial port and programmable general purpose input/outputs (GPIO), as well as clock, phase lock loop, timing, watch dog timer, RAM, ROM and flash memory functions. The pull-up resistors R15(pin4,5), R15(pin3,6) and R16(pin2,7) on the DSP's programmable 10 (input/output) pins GPIO18, GPIO29, and GPIO34 shown in FIG. 7 keep the voltage high on those pins during power-up. This configures the DSP to boot from flash upon power-up. However, GPIO34 can be forced low to put the DSP in programming mode as can be done by an external source, such as through the DB9 connector shown in FIG. 8. Communication of the DSP with an external source can occur via the DSP's serial transmit (SCITXD) and receive (SCIRXD) ports through the DB9 connector.

In particular, the DSP can communicate with a personal computer through its serial port or other digital I/O port. More particularly, the DSP can be configured to read out some or all of its memory one time or cyclically, whereby it is possible to monitor the state of various parameters while operating the tools. This makes it easier to monitor the effect of various external events or conditions on the operation of the DSP. Furthermore, it is possible to configure the DSP to store data from a contact event, as described above, in some programmable memory and then read out that stored data via the serial communications interface. This facilitates quick analysis of any event that registered as contact. By providing access to the serial communications interface on the DSP, it is also possible to program the DSP via the serial port, which provides a quick and convenient way to accomplish this programming.

The cycle time of the DSP is selected as 10 nanoseconds, defined by the 20 MHz ceramic resonator X1 connected to the DSP as shown in FIG. 7, along with an internal phase lock loop×10/2 within the chip which provides for 100 MHz operating frequency. Although a ceramic resonator is not typically as accurate as a crystal, it is far more mechanically robust against vibration or other shock, such as might be found in power tools or occur during sonic welding, for instance. As a second alternative, it is also possible to use a solid-state oscillator, which is typically the least accurate, but provides the best possible mechanical durability.

Figure 8:
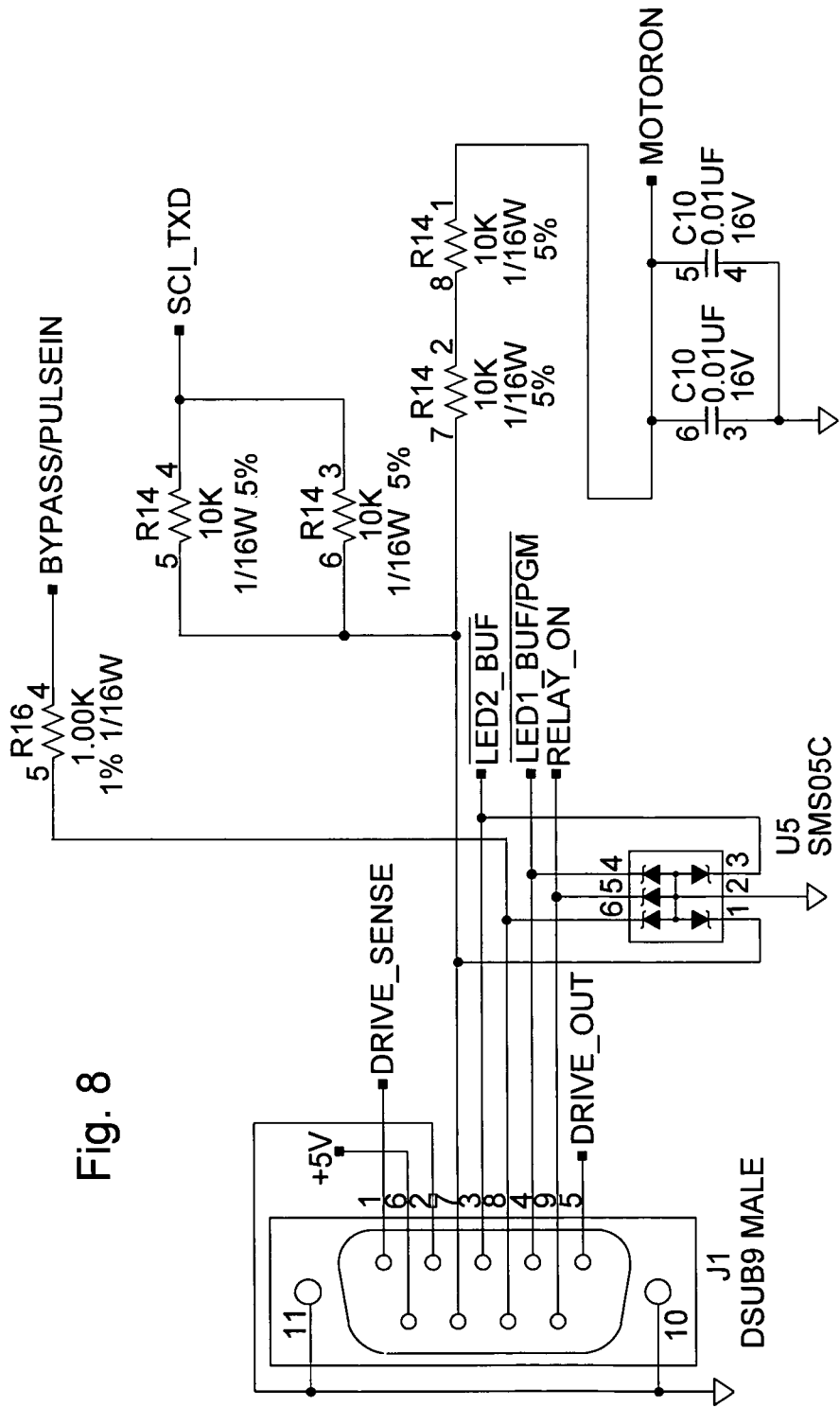
FIG. 8 is a diagram of connections between various components in a machine.

FIG. 8 shows an example of using a 9-pin DSUB connector to connect the electronics in the cartridge to a power supply, to a sensor assembly comprising arbor electrodes (similar to contact detection plates 44 and 46 discussed above), to switches, to a motor, and to an output display such as LEDs. Transient voltage suppressor U5 provides static discharge protection on the interface lines that travel external to the cartridge.

Circuits in the cartridge may require voltages other than the 5V provided by a power supply and delivered to the cartridge. In this embodiment these additional voltages are provided by several subcircuits depicted in FIGS. 9-11. FIG. 9 shows an example of a circuit which generates 3.3V from 5V for use with circuits which require 3.3V. Similarly, the circuit in FIG. 10 generates 1.8V from 5V. FIG. 11 shows a charge pump circuit which can generate 10V from 5V. This circuit is implemented using a microcontroller's pulse width modulator output which periodically switches the voltage on capacitors C6(pins3,6) and C6(pins4,5). Initially, C29 is charged to 5V through D3. Capacitors C6(pins3,6) and C6(pins4,5) also charge to 5V through D3 when the output of the pulse width modulator is low. When the output of the pulse width modulator goes high, capacitors C6(pins3,6) and C6(pins4,5) are charged to 5V but with reversed polarity forcing C29 to charge up to 10V. This process is repeated with every pulse from the pulse width modulator as it is necessary for C29 to be continually recharged in order to supply power to other circuits.

FIG. 12 shows circuits that enable a microcontroller equipped with an analog to digital converter (ADC) to monitor the 5V, 3.3V, 1.8V and 10V power rails by periodically sampling these voltages and processing the voltage data. Monitoring these voltages helps to ensure that the safety system will work properly. The voltage level of the power supply line powering the cartridge board circuitry is monitored to insure that it is neither too high nor too low. If any of these levels are outside the expected limits, it may indicate a fault whereby the system may choose to disable the operation of the motor to minimize any danger to the user under those circumstances.

A reset chip U8, shown in FIG. 13, is used to hold the DSP in reset at application of power until the power supply has achieved proper operating voltage. It also isolates certain sensitive control signals from the DSP until the DSP is able to properly assert them through software control. It does this by controlling the output enable of a 3-state buffer/line driver U6 through which these signals are routed as shown in FIG. 14. When the DSP is initializing, the output of this buffer defaults to a forced known state due to the configuration of the circuit.

A switch SW1, shown in FIG. 15, is one means of conveying information to the DSP. For example, a cartridge may be constructed so that switch SW1 is used as a safety interlock for the mechanical positioning of the cartridge. In this case, the switch is not closed unless the cartridge is properly positioned and installed. If through the switch state, the DSP determines that the cartridge is not properly positioned and attached to the saw, the DSP would not allow the saw to run.

The circuit of FIG. 16 provides a temperature sensor, in the form of thermistor R30, which forms a divider network with resistor R18. The node between R30 and R18 is connected to one of the ADC inputs to the DSP so that the DSP can sample the voltage at that node and thereby monitor the temperature of the thermistor. Thermistor R30 is preferably placed in thermal contact with or in close proximity to capacitor C8 shown in FIG. 21 to thereby more directly reflect the temperature of C8. Capacitor C8 is part of the release mechanism (labeled 34 in FIG. 1). It is used to supply the energy to melt fusible member 70 in FIG. 3 to release spring 66 which pushes brake pawl 60 into blade 40 to stop the blade's rotation. C8 is typically an electrolytic capacitor and the performance of such capacitors falls off as their temperature drops. The use of thermistor R30 provides a way to monitor the temperature of C8 to insure that it is capable of burning the fuse wire if necessary. A suitable value for C8 is 1000 uF, which has been oversized to provide sufficient energy to burn the fuse wire under worst case conditions as described above.

Figure 17:
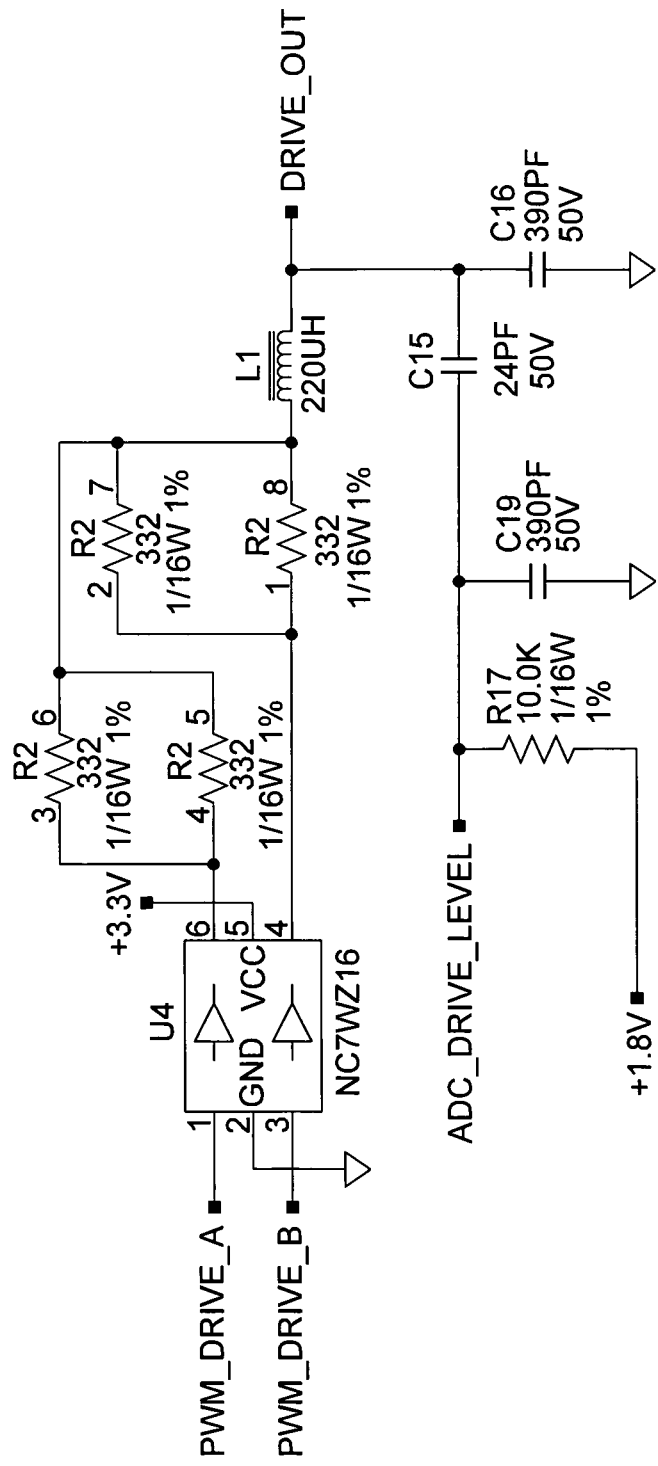
FIG. 17 is a diagram of a circuit for a 500 KHz digital to analog converting driver.

FIG. 17 shows a circuit for a sinusoidal 500 KHz driver derived from a purely digital controller. The objective of this circuit is to generate a stimulus under software control which is used to drive the capacitive coupling electrode to impart a signal onto the blade. The software in the DSP controls the phase relationship between a complementary pair of hardware pulse width modulators (PWMs), and allows for a wide range of signal amplitudes of the resulting sinusoid. The sine wave signal is adjustable over a range of approximately 0 Vp-p to 20 Vp-p (5 to 20 volts peak-to-peak typical) to compensate for the effects of blade loading, etc. It is also preferable that the software is capable of turning off the driver completely, as well as providing for compensation for non-linearity in the response of the driver circuit. A suitable adjustable voltage resolution is about ⅛% of full scale, although other values could be used. In addition, it is desirable for a means for the DSP to measure and monitor the output voltage of the driver with an accuracy of a few percent.

The basic approach used in the driver is to generate two 500 KHz square wave sources of variable duty cycle and/or phase and to drive a resonator with the combined waveform in order to create a sine wave output of variable amplitude. Note that a 1 Vp-p square wave is composed of multiple Fourier components, among them is a fundamental sine wave component of about 1.3 Vp-p. The use of the $2^{nd}$ order resonant filter composed primarily of L1 and C16 provides attenuation of the higher order harmonics as well as resonant selectivity of the fundamental tone.

In order to modulate the amplitude of the sinusoid, software provides for precise phase shift control on the hardware PWM outputs Drive A and Drive B. In this embodiment of the invention, the signals on Drive A and Drive B are fixed 500 KHz frequency 50% duty cycle square waves. The phase difference between these outputs, along with summing resistors network R2, alter the effective waveform feeding the tuned resonant circuit. An additional and necessary function of the network R2 is to dampen the LC response of the filter. The end result is that through phase control of the hardware PWMs, the DSP is able to regulate the amplitude of the output analog sinusoid at the node DRIVE_OUT.

Integrated circuit U4 acts to buffer the output of the DSP, and provides low impedance drive to the circuit to allow for stiff output regulation under various blade and circuit loading conditions. In addition, since this buffer is powered from a regulated 3.3V, the circuit is insensitive to fluctuations in the unregulated 5V input as when, for example, a relay, charger, or other high current circuit disturbs the 5V line.

The resonator is formed by L1 and C19, C15, C16, and any reactance loading at the DRIVE_OUT node. Economics motivate the use of a 5% tolerance on the inductor and capacitors, with additional uncertainty due to temperature. In addition, the capacitance looking out the DRIVE_OUT port can vary between a nominal level when the blade is not loaded to a higher level when sawing wet wood, and it is desired to have this variability affect the amplitude of the signal at DRIVE_OUT by only a few percent. These factors, combined with the desire to generate the voltage range of 5 to 20 Vp-p at DRIVE_OUT, led to the use of a Q of around 5 to 7 in the resonator. This Q is set by the resistors R2(pin3,6), R2(pin4,5), R2(pin2,7) and R2(pin1,8) combined with the typical loss in the inductor. The actual timing of the resonator is not critical to the operation of the system, as it can be compensated for in many ways. However, provisions have been included to monitor the actual drive level through sampling the drive waveform with the onboard ADC of the microprocessor. This provides for an added means to insure the drive output is within regulation.

Figure 18:
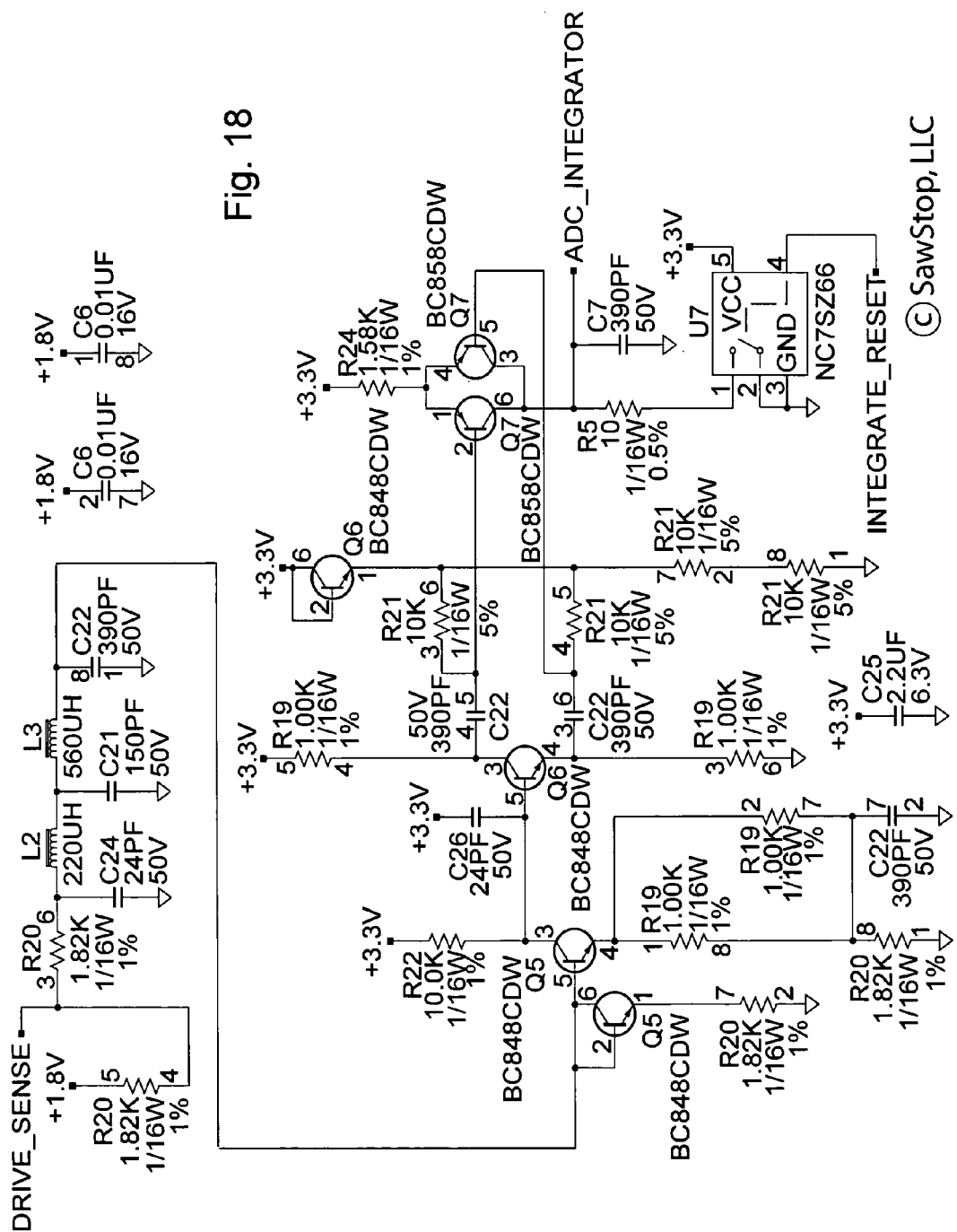
FIG. 18 is a diagram of an integrator circuit to condition the signal from the blade.

FIG. 18 shows a filtering and integrator circuit that may be used in the above-described methods. The circuit provides the means to periodically measure the amplitude of the signal detected on the blade of the depicted embodiment. The response of the filter is tuned to match the stimulus frequency of interest, in this case 500 KHz. The integrating interval is performed under software control, in this case every 6 microseconds. This circuit is preferably designed to maximize immunity to spurious signals at other frequencies, as well as to provide relative immunity to electrostatic discharge from events such as the charging of the blade/arbor from a rubber drive belt or cutting of non-conductive materials. However, it should be understood that this function could be accomplished many different ways including with a peak amplitude detector, a power detector, or direct sampling of the signal with an A/D converter to measure the amplitude of the signal. Also, although the measurement in the present circuit is carried out at discrete time intervals, it should be understood that such a measurement could be carried out continuously, or the rate could be varied under software control.

The topology of the circuit is to amplify and full wave rectify the signal at the node marked DRIVE_SENSE, which through wiring is connected to an arbor electrode. Filtering is used in this circuit to minimize interference by spurious signals. A network of components surrounding L2 and L3 form a band pass filter centered on the expected frequency of the sensed signal, typically about 500 KHz. C22 and C26 provide extra frequency domain response filtering. The end result of all these elements is reduced opportunity for noise to get into the circuit and disturb the desired measurement. After filtering and gain stages, Q6(pins 3,5,4) acts as a phase splitter to split the measurement signal into two components 180 degrees out of phase. These outputs are level shifted by Q6(pins6,2,1), C22(pins3,6), C22(pins4,5), R21(pins3,6), R21(pins4,5), R21(pins7,2) and R21(pins8,10) such that the two sine waves oscillate 180 degrees out of phase at the same bias voltage. Transistors pair Q7 then converts the negative swinging peaks appearing at their bases into a current proportional to their amplitude that is steered into integrating capacitor C7. The net effect is a full wave rectified current flowing through Q7 and into C7. The result is a ramp waveform across C7 with peak amplitude proportional to the amplitude of the 500 KHz signal detected at the input node DRIVE_SENSE. It should be understood that there are a number of other circuits that could provide this full wave rectifying and integrating functionality, including level detectors, rms meters, etc.

The voltage at the integrator capacitor C7 is sampled by the microcontroller ADC at the end of the measurement period and then reset to 0V to start a new sampling interval. The microcontroller uses U7 as a low impedance switch to perform this reset. The measurement period of 6 us was chosen to be synchronous with the period of the drive signal (2 us) and to be an integer multiple of the number of cycles of the drive signal to minimize ripple in the measurement.

In addition to the filtering provided by analog elements in the circuit, the attached code implements a type of digital filtering on the signal to further reduce noise and properly discriminate between noise and signal. In particular, the integrator output, sampled and digitized just prior to integrator reset, is stored as a 12 bit unsigned binary number. The control software attempts to regulate the average level to a value of 3500. Perturbations on the blade will cause modulation in this level, which is tracked by the software in order to make decisions on whether a dangerous condition is evident. A memory location in the microcontroller keeps track of the filtered or "recognized" integrator value. Any sudden changes in this value are limited to a maximum change, maxstep, which reflects an empirically determined maximum rate of change for true contact events (i.e., chosen to approximately match the largest changes expected to be created by human contact), and helps reduce sensitivity to a grounded blade that would occur from contact with metal, etc.

In addition to the above described digital filtering, the attached code also implements a type of hysteresis filtering as well as de-glitch filtering to keep noise from affecting the current dV/dt sum calculation. Changes in integrator values are only recognized to the extent they exceed a threshold step, i.e., the filter requires update if the new values are not tracking closely to the filter output. The threshold step can be made dependent on whether the step is a positive or negative change and whether the step is in the same direction or opposite direction as the prior step. Since the dV/dt values are the changes in integrator count from sample to sample, eliminating small variations in the integrator count reduces the effect of noise on the sums that are used to detect contact, by eliminating the effect of many small changes and instead only recognizing relatively large changes such as might be induced by a contact event.

In some implementations, such as in a table saw, a metal brake pawl is positioned adjacent the perimeter of a blade and it is desirable to detect whether the pawl is sufficiently close to the blade or otherwise positioned properly. It is also sometimes desirable to confirm that a blade with a predetermined diameter is installed in the saw. These functions can be accomplished by detecting blade-to-pawl spacing. This can be accomplished by a variety of techniques including but not limited to mechanical, optical, electrical and/or magnetic means.

In this implementation, the signal measured on the pawl electrode is sampled in order to detect the distance between the blade and the brake pawl. Recall that some of the signal induced on the blade will couple to the pawl due to proximity. A pawl that is not properly adjusted may occasionally electrically short out the blade, blocking the ability to accurately detect contact. Also a pawl that is too distant from the blade may increase the amount of time between contact detection and stoppage of the blade. Detecting the blade-to-pawl spacing is one way to insure the cartridge is properly installed and to insure that a blade with a predetermined diameter is installed in the saw.

Figure 19:
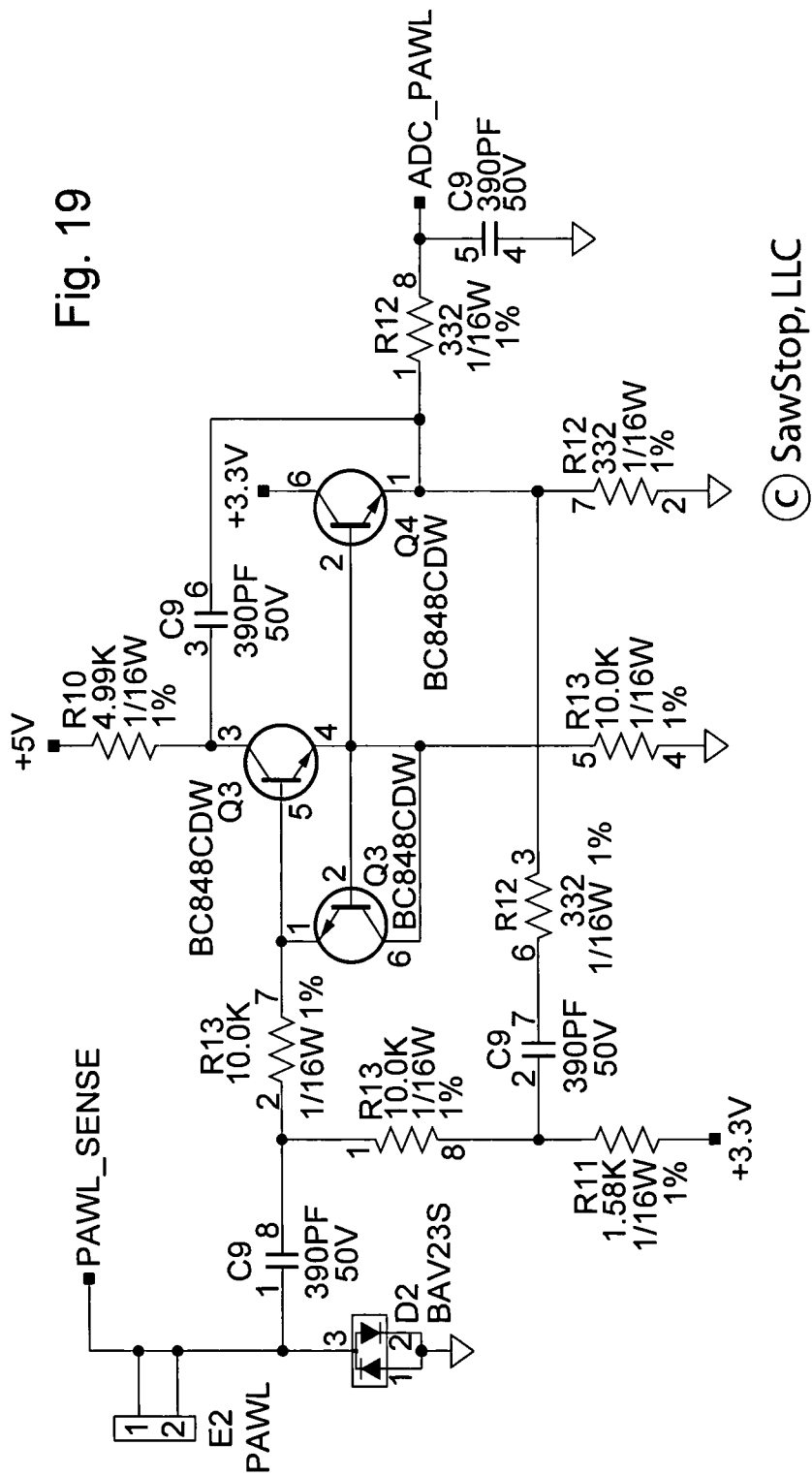
FIG. 19 is a diagram of a circuit that can be used to detect electrically the spacing between a blade and a brake pawl.

FIG. 19 shows one circuit that may be used to electrically detect blade-to-pawl spacing. This test is used prevent operation of the saw if the saw is equipped with a blade that is too small for the installed cartridge, such as an 8" blade instead of a 10" blade, or with a blade that has a non-conductive hub. This can also be used to insure that the brake pawl is positioned close enough to the blade to engage the blade quickly in the event of an accident. In the depicted circuit, the input is connected to the metal brake pawl through a piece of metal that is soldered to the circuit board at E2 and is in contact with the brake pawl on its other end. The output of the circuit drives an analog-to-digital converter (ADC) input on the DSP microcontroller. The circuit of FIG. 19 provides a relatively high impedance input so as not to load down the small signal that is present on the brake pawl. The circuit uses tuned bootstrapping or feedback to maximize the input impedance at 500 KHz while providing a lower impedance to signals at other frequencies. The output stage has sufficient drive impedance to drive the input to the ADC and overall the circuit provides a gain of approximately one.

The DSP samples the portion of the drive signal which appears on the saw blade and is coupled to the metal brake pawl. The strength of the signal is inversely proportional to the distance of the brake pawl to the blade. The analog-to-digital converter directly digitizes the pawl signal and determines its amplitude in firmware, although other techniques are possible such as using a detector circuit.

If the measurement is not above a certain threshold representing the maximum acceptable spacing between the blade and pawl, an error is set by the DSP which must be cleared before the motor can be started. The DSP continues to periodically check the blade-to-pawl spacing when the motor starts running as it may change, for example, from vibration or eccentricity in the blade. Because there can be some fluctuations in the measured signal level during start-up, the threshold that is used once the motor starts running is relaxed. There is also a certain hysteresis in the threshold used once the motor is running so that a marginally adjusted pawl setting (very close to the threshold) will not cause an error once the blade starts to spin. In other words, when the motor is running, the threshold is lowered a bit and an error is registered only if the signal persists in remaining below the lowered threshold. The signal is sampled every 6 us and the exact sample point of the measurement is changed, or slipped, in order to get samples from different parts of the 500 KHz signal in a form of undersampling. In the accompanying code, the phase is slipped by 80 ns every 768 microseconds. After 25 samples are recorded 80 ns relative to the phase of the signal, a complete amplitude of the waveform is reconstructed. If the microprocessor determines the spacing is not within tolerance, or is no longer within tolerance, the motor will not be allowed to start, or it will stop if in a run sequence, until the spacing is corrected.

Figure 20:
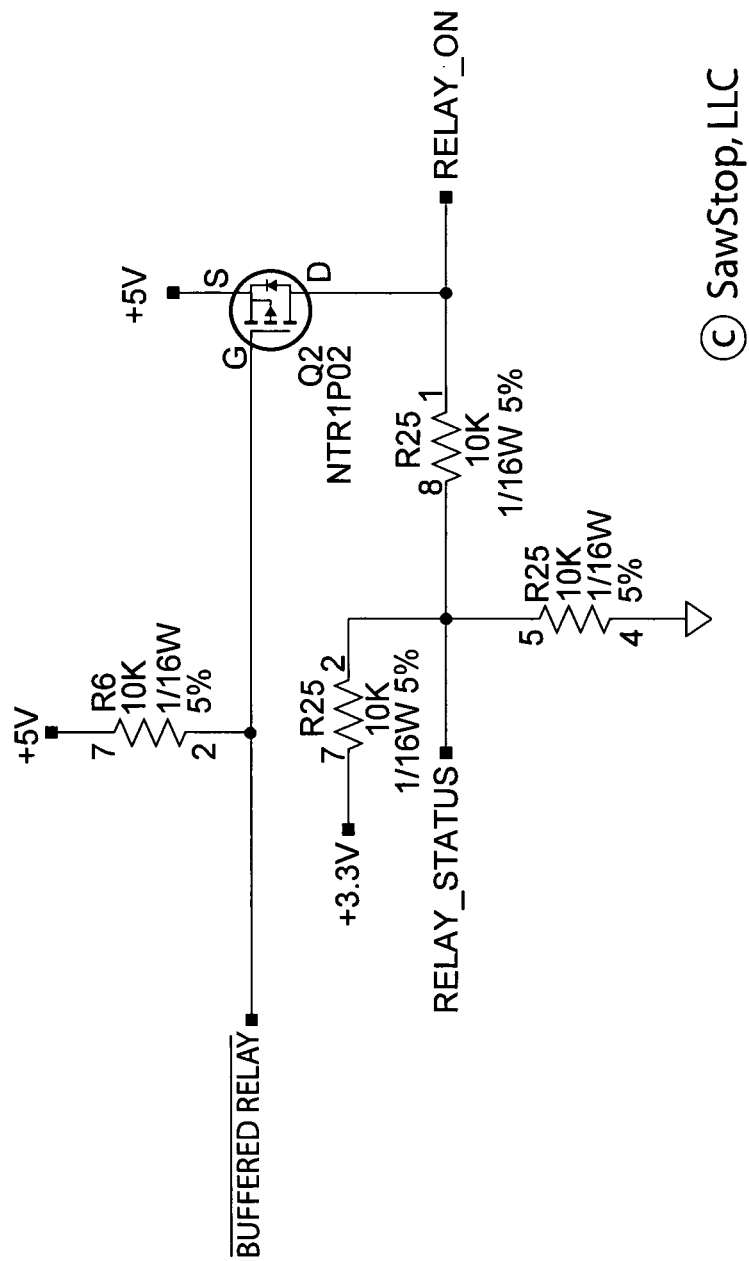
FIG. 20 is a diagram of a circuit used to energize motor control relays as well as allow a microcontroller to monitor the relay control line.

FIG. 20 shows a circuit used to energize and control the motor control circuitry on the power module. The DSP controls the state of the relay control line through a signal which is buffered through U6 as shown in FIG. 14. The reset circuit of FIG. 13 ensures that the relay is turned off while the system is in reset or powering-up. The DSP employs sophisticated algorithms in order to generate relay line sequences critical for the startup of the motor. These sequences follow a prescribed order to perform tasks specialized for particular circuit implementations. Depending upon the circuit implementation, examples of tasks which may be preformed are power supply switchover, SCR line modulation, motor relay activation, as well as disabling a failsafe relay which is designed to prevent the motor from ever running unattended even during hardware failure. The relay line also drives a deadman circuit, as will be described hereafter. Routines in the DSP control when the signal RELAY_ON is energized to 5V, as well as the period, duty cycle, and pulse sequence that it generates. Circuitry within the power module responds to these sequences, performing different functions depending on the sequence commanded. For instance, in some implementations, during coastdown on an equipped saw, the motor can deactivate the main energizing relay while keeping an SCR active. This prolongs the life of the relay by preventing arcing. Also, the relay sequence from the DSP can keep power switched on to the DSP during coastdown active, regardless of whether the customer turns off the power switch. This will allow the DSP to keep the safety system enabled if a customer improperly attempts to cut the power to the saw, which is discussed in more detail hereafter.

The DSP sets the period and pulse width of the signal RELAY_ON via software control on one of its GPIO outputs. A GPIO port is used for control of this line rather than a pulse width modulator (PWM) output to minimize the chance that the DSP could drive this line so as to turn on the motor unintentionally. On DSP U3, the PWM lines run independently of the main processor core and therefore could continue to oscillate even when the main processor core was in an error state such as an infinite loop or locked up. This would present the possibility of the motor remaining on when the detection system was not working correctly. By using the GPIO port for this function and turning it on and off only in the course of normal code loop execution, the chance of this line pulsing as necessary to turn on the motor is greatly minimized, thereby improving the overall safety of the system.

The microcontroller can read back the status of the relay signal through R25(pins8,1) to test whether the circuit is functioning properly. The status of the relay line is tested once every 768 microseconds to see if the voltage on that line is operating at the proper level or is different than expected. Should the test fail, the system will set an error and the motor will not start or will enter a coastdown state if running.

The motor start logic allows the motor to be jogged without the blade in place in order to provide a way for the operator to determine the direction of arbor rotation prior to installation of the blade. In saws designed to run on three-phase power, the motor may spin in either direction depending on how power is hooked up to the saw and this feature allows the user to determine the rotation without the blade attached. If the blade is attached and the motor starts running backwards, it is possible for the blade to unthread the nut and spin off. Testing motor rotation without the blade in place avoids this potential problem. The motor jog feature uses the blade-to-pawl spacing detection to insure that no blade is present before allowing the motor to jog. The DSP microcontroller requires a special motor jogging control sequence involving a keyswitch as well as another switch, such as a start/stop paddle, so the user is unlikely to jog the motor unintentionally.

Figure 21:
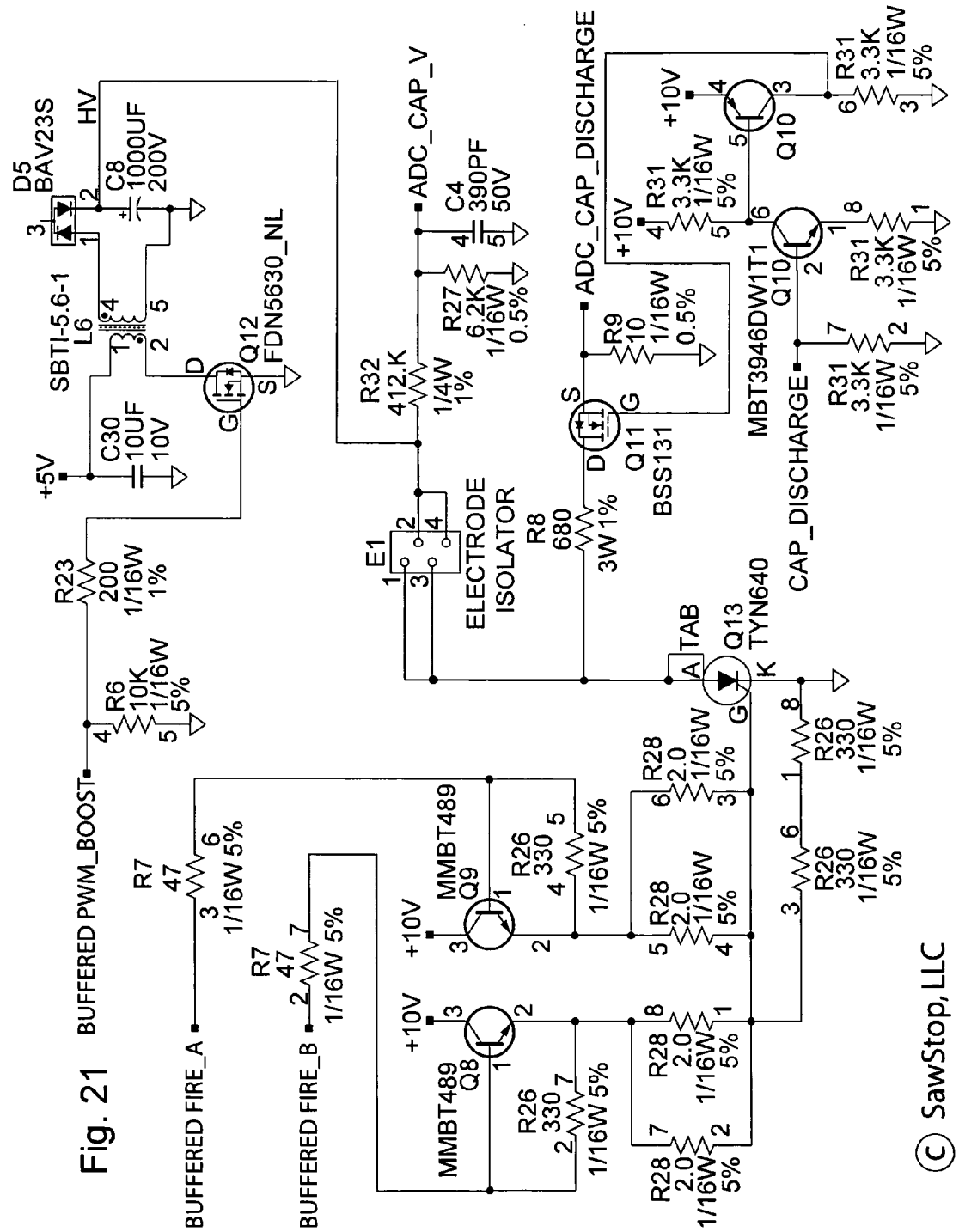
FIG. 21 is a diagram of a circuit relating to the high voltage circuitry used in a firing subsystem as described herein.

FIG. 21 shows a circuit used in firing subsystem 76, discussed above. In this circuit, an onboard boost regulator, controlled by the microcontroller, is used to charge high voltage capacitor C8 to a voltage at which it has sufficient stored energy potential to burn a fuse wire placed across electrode E1. The microcontroller is able to use SCR Q13 to discharge the electrical energy stored in capacitor C8 through the fuse wire. This surge of energy vaporizes the fuse wire across the electrodes, which in turn releases a stored energy source such as a spring. The expansion of the spring, for example, forces the brake pawl into the rotating saw blade causing the blade to abruptly come to a halt. In order to melt the fuse wire, the SCR conducts hundreds to thousands of amperes for a few tens of microseconds. To ensure that the SCR turns on fully and quickly it is desired to deliver in excess of 1 ampere of current quickly into the gate. This is done with transistors Q8 and Q9 which are configured as two independent current sources. This redundancy helps to prevent single-point failures. The GPIO outputs from the DSP that control firing are buffered through U6 of FIG. 14. The circuitry around Q8/Q9 was designed to prevent the SCR from triggering until the DSP has initialized and has asserted control over line driver U6. Use of two redundant control lines, buffers and transistors provides complete redundancy on the gate drive circuitry to minimize the chance of failure.

In order to confirm the functionality of the circuit, means are provided for a self test of the circuit at device initialization. This test is performed using all the components of the firing circuit, with the voltage on C8 at a low level, typically around 3V, so that there is insufficient current to overstress the fuse wire but enough current to permit verification that the firing circuit is functional. High voltage capacitor C8 is charged up to typically around 3V by the action of the boost charger Q12/L6/C30/D5 circuit which is duty cycle controlled by the microcontroller to regulate the voltage on C8. A small amount of leakage current flows to ground through resistors R32 and R27, which are used by the microcontroller to provide feedback of the voltage appearing across C8. Once the capacitor C8 is charged, the SCR is triggered and the discharge waveform of C8 is tested to insure the circuitry is performing properly.

Capacitors can degrade over time, therefore means is also provided to measure the capacitance of C8 to insure it is functioning as intended. This can be accomplished without interfering with the ability of the capacitor to deliver sufficient current to melt the fuse wire, so it can be performed repeatedly throughout the life of the capacitor even while the circuit is in operation. With the capacitor charged to a target voltage, typically around 180V, a momentary load is applied to the capacitor and the resulting brief and slight change in voltage is monitored and the capacitance can be calculated from this voltage change. If this load is applied for a short period of time, typically 5 milliseconds or less, then there will only be a small percentage change of voltage on the capacitor C8, typically ½ to 1 percent, and so more than ample charge remains available in C8 to melt the fuse wire if called upon to do so. The load is provided by resistors R8/R9 and FET switch Q11, with a provision for measuring the discharge current by measuring the voltage across resistor R9. Complementary transistors pair Q10 as well as R31 are used as a level translator to insure that FET Q11 has enough gate enhancement to turn on fully and quickly under the control of the microcontroller. The voltage change across C8 resulting from that load causes a corresponding change of voltage across sampling capacitor C4. Sampling both the current through resister R9 and the voltage across C4 provides a way to directly measure the capacitance of C8 and therefore ensure that the energy potential stored in C8 is capable of vaporizing the fuse wire. Various other methods are available for verifying the condition of the energy storage capacitor C8. Alternatively it is possible to calculate the capacitance of C8 by monitoring the time it takes to charge up, or by monitoring the voltage characteristics with time during the low voltage discharge test. Also, by measuring the current and knowing the resistance in the discharge path it is possible to compute the voltage on C8, independently from divider R32/R27 thereby providing an independent and redundant measure of the capacitor voltage.

The discharge test resistor, R8, is a single 3 W 680 ohm leaded resistor placed in thermal contact with capacitor C8. One way of achieving such a thermal contact is to place R8 adjacent to C8 and apply a thermally conductive compound between them so that heat can be transferred from R8 to C8. Another means is to thermally couple R8 to C8 through traces and copper on the printed circuit board. With the described configuration, it is possible to heat C8 using R8 to bring C8 to a satisfactory operating temperature.

It is possible to configure the DSP to track the temperature of C8 via thermistor R30 and then trigger more frequent discharges through R8 to increase its heat output as necessary to bring C8 to minimum suitable operating temperature. In one implementation of this technique, the DSP tracks the temperature registered by R30. If the temperature is below a low threshold where sufficient energy delivery from C8 to burn the fuse wire cannot be guaranteed, the DSP triggers one or more discharges through R8, sufficient for instance for R8 to dissipate approximately 2 W and thereby rapidly heat C8. At a second threshold temperature, the DSP could trigger discharges through R8 sufficient to generate approximately 1 W of heat dissipation, which is sufficient to raise the temperature of the capacitor 10-20 degrees above the ambient temperature to increase the energy available for delivery to the fuse when the circuit is fired. The specific details of the discharge periods and duty cycles are set forth in the attached code.

The exemplary circuits shown in FIGS. 7 through 21 may all be implemented on a circuit board housed in a replaceable cartridge, as explained above.

Figure 22:
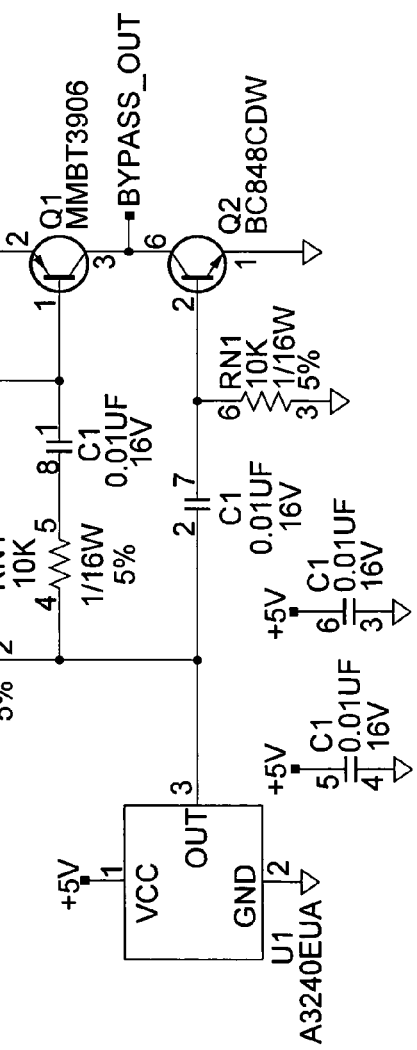
FIG. 22 is a diagram of a circuit used to sense rotation of a cutting tool.

It is desirable to prevent the brake cartridge from firing if a person touches the blade when it is not spinning. This is accomplished by monitoring when the blade is spinning, and having the software only command the activation of the brake cartridge if contact is detected while the blade is currently spinning. In a table saw, the blade is mounted on an arbor and spins when the arbor is rotated by a motor. Thus, blade rotation can be monitored by sensing for arbor rotation. FIG. 22 shows a circuit which may be used to detect arbor rotation and send this information to the microcontroller. The circuit includes a Hall effect sensor U1 which can detect the presence of the south pole of a magnet when the magnet is perpendicular to the sensor. The Hall effect sensor would be mounted in the saw adjacent the arbor, and the magnet would be embedded within the arbor and oriented such that its south pole lines up perpendicularly with the Hall effect sensor as the south pole passes by the sensor while the arbor is spinning. Once per revolution of the arbor, the Hall effect sensor produces a voltage pulse at its output in response to the proximity of the field. There is some hysteresis built into the device such that the sensor turns on at a different point from which it turns off. This hysteresis helps to provide a clean transition in the output of the sensor during boundary conditions. Any number of alternate methods may be employed to sense arbor rotation, including multiple magnetic senders, optical encoders, etc.

For the circuit in FIG. 22, Q1 and Q2 are designed to provide an output pulse regardless of the default state of the bypass line. For example, if the bypass output is loaded to ground, Q1 actively drives this line to approximately 3.3V when a transition is detected on the output of U1. Likewise when the bypass output is loaded to a positive voltage, Q2 briefly drives this line to ground when a transition is detected on the output of U1. In this manner rotation pulses can be detected while using this bypass out line as a general purpose signaling control line between the cartridge and the power module. As the blade spins, a series of pulses will be seen on BYPASS_OUT where the time between the pulses will be proportional to the rotational speed of the blade. The output from this circuit (BYPASS_OUT) is used by the DSP or microcontroller on the cartridge board to detect when the saw blade is spinning.

Rotational sense pulses on BYPASS_OUT can be sampled by one of the enhanced capture (ECAP) inputs on the microcontroller. These inputs allow the microcontroller to take accurate measurements of the pulse duration timing of each pulse, as well as determining the repetition rate of the pulses on the line. Measuring the pulse duration allows discrimination of a rotation event from another noise event or normal toggling of the control line that may be customer initiated. The microcontroller can then process this data after first filtering out changes on BYPASS_OUT that are due to changes in the bypass switch status. By tracking the time between rotation pulses, the microprocessor can determine the speed of the blade and also when the blade is speeding up or slowing down. This information is used to disarm the protection system when there is no longer any rotation of the saw blade or when the blade has slowed sufficiently to not present a hazard to the user.

One situation that requires particular attention is when the blade is coasting down to a stop. While the blade is coasting down, the safety system is preferably active to continue to provide protection against serious injury. But as soon as the blade has stopped spinning, the safety system is preferably not active to allow the user the freedom to make contact with the blade. Reasons why a user might contact the blade include taking a measurement, removing a piece of wood, or changing the blade. Because a user expects to be able to touch the blade as soon as it appears safe to do so, the safety system should preferably disarm just after, and as close as possible to the time the danger has passed.

The speed of the blade can be approximated by sampling at least two rotational sense pulses. As the blade slows down, however, the time between pulses grows larger and it becomes more difficult to accurately determine the time at which the blade comes to a stop or when the blade has slowed down enough so that it no longer presents a danger to the user. This is because it is not known when the last pulse will occur and when the last pulse does occur it is not known whether another pulse is coming. Since a pulse only occurs once per blade revolution, the blade may still present a danger before it comes to a stop even after the last pulse has occurred.

One method for dealing with this situation would be to detect when the blade is spinning slower than a certain rotational rate and then allow for a fixed amount of time before the safety system is disarmed. This method may work adequately for the most part but would lack precision. An unnecessary activation of the safety brake may occur when someone touches the blade after it has stopped but before the safety system disarms, or the safety system may disarm while the blade is still moving fast enough to cause injury. In applying this method in practice, there is a significant inherent uncertainty as to when the blade will come to a stop. Also, to avoid any chance of the system being deactivated before the blade has come to a stop, the system would need to utilize a fixed time after the last rotational pulse that is long enough to cover the worst case blade deceleration. This relatively long fixed time (on the order of one second) ensures that the safety system will be armed whenever the blade is moving so that injuries will be prevented. However, at the same time, it will cause the system to inevitably be active for some period of time after the blade stops under many normal circumstances. As stated earlier, a user expects to be able to touch the blade as soon as it appears safe to do so and often does make contact with the blade either by touching the blade directly or by touching the blade with a tool or tape measure while moving on in haste to the next task. As a result, with such a system the user is likely to contact the blade after it has stopped but before the system has recognized the stop and disarmed the brake, thereby leading to unnecessary activations of the brake.

A significant improvement to the method described above can be achieved by using the DSP to process rotational speed data in such a way as to predict when a blade which is coasting down will actually come to a stop. The system employs active blade trajectory tracking algorithms that compute the deceleration of the blade and accurately predict when the blade will stop or is no longer spinning fast enough to cause harm to the user. The DSP then uses this algorithm to switch into an unarmed mode where contact with a stationary blade will not cause the system to activate. The more accurately the blade stop time can be predicted, the less likely the chance of the safety system firing inadvertently due to someone touching the blade after coastdown but before the safety system has been disarmed, or someone being injured due to premature disarming of the system.

This method utilizes the fact that as the blade slows down, the falling edges of the pulses on BYPASS_OUT will occur less and less frequently and a plot of the speeds verses time yields a locally linear slope of decline. That is, if one were to plot the speed of the blade on a y-axis versus time on an x-axis, one would obtain an approximately straight line of negative slope that would cross the x-axis at the point of zero speed, which is the point at which the blade will have come to a stop. By computing the speed of the blade at various points in time, the point of intercept with the x-axis can be extrapolated with such accuracy that deviations from the actual stop time are humanly unperceivable or so small as to be insignificant. Without a predictive coastdown routine as employed, there would be a large amount of uncertainty as to when the blade had actually stopped spinning.

Figure 23:
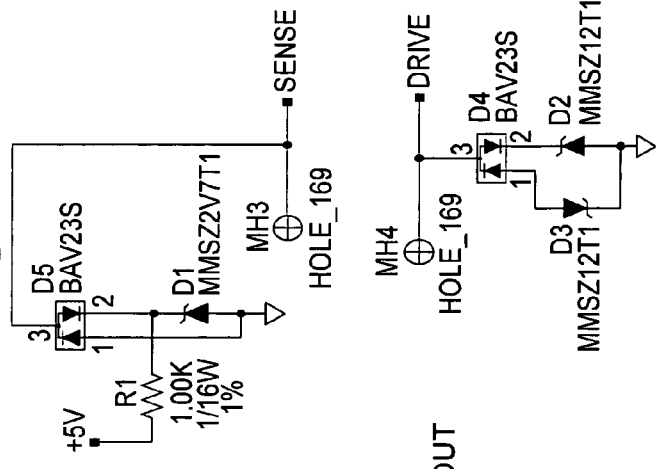
FIG. 23 is a diagram of a circuit used to provide transient suppression/protection for electrical signal lines which connect to electrodes adjacent to a cutting tool.

As discussed above, means is provided to generate a 500 KHz sine wave and impart that signal onto the blade. FIG. 23 shows connections to two electrodes that are used to impart the signal to the blade. In one exemplary embodiment, the electrodes encircle but do not touch the arbor to form a capacitive coupling with the arbor. Generating the signal on one of the electrodes will capacitively impart that signal to the arbor and blade. MH4 is the connection to that electrode. The other electrode is used to sense and monitor the signal on the blade, and MH3 is the connection to that other electrode. Transient voltage suppression is provided by zener diodes D1, D2, and D3 in conjunction with diodes D4 and D5. The diodes are placed near the arbor connections in order to minimize the chance of electrostatic discharge on the analog signal carrying electrodes. This helps to prevent any static discharges from the blade from damaging the electronics within the cartridge. Adding D4 and D5 also minimizes the effects of parasitic capacitance.

Figure 24:
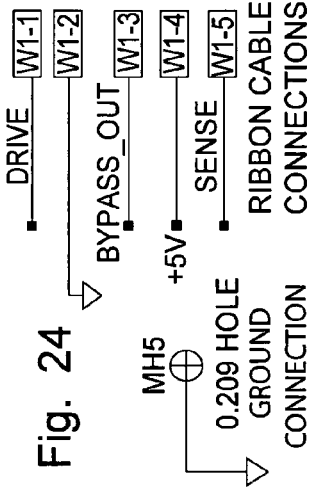
FIG. 24 is a diagram of ribbon cable and ground connections.

Both the Hall effect sensor circuit in FIG. 22 and the electrode connection circuit in FIG. 23 can be on the same circuit board, mounted adjacent the rotating arbor. FIG. 24 shows connections between this circuit board and the cartridge. Those connections are made through a five-wire ribbon cable. MH5 is a local ground connection for this circuitry, and provides a method for providing a ground connection from the electronics to the metal used in the machinery.

FIGS. 25a, 25b and 25c together show a diagram of a connector and cable assembly which connects a brake cartridge to a five-wire ribbon cable going to the rotation sense circuit board with the Hall effect sensor, and to a nine-conductor cable with ground shield going to a power module board housed in a switch box. As indicated in FIG. 25a, the five-wire ribbon cable connects to the rotation sense circuit board at the connections shown in FIG. 24. The other end of that ribbon cable connects to a circuit on a circuit board enclosed in a connector housing, as shown in FIG. 25b. A series of wire holes in which the ends of the five wires in the ribbon cable can be soldered are at one end of that circuit board. At the other end there is a female 9-pin DSUB connector which is permanently mounted in the saw and used to connect to the safety cartridge. A nine-conductor cable with ground is also attached at one end to the circuit board in the connector housing. As shown in FIG. 25c, the other end of the nine-conductor cable ends with a 9-pin male DSUB connector used to connect to a power module board that is housed in a switch box. FIG. 26 is an illustration of the entire connector/cable assembly described in FIGS. 25a-c. The nine-conductor cable may include a ferrite filter 150, shown in FIG. 26, to filter noise.

Means may be provided to dissipate static charge that may be present on the cartridge board when it is removed from its packaging and before it mates with its connector. This may be accomplished by connecting the shield of the DSUB connector in the saw to ground thereby providing a discharge path. Static charge may then dissipate when the cartridge contacts the shield before it mates with the connector.

A user interface between the operator and the microcontroller on the cartridge board is provided via a power module board which is housed in a switch box. FIG. 27 shows a 9-pin DSUB connector that is used to connect the power module board to the nine-conductor cable shown in FIG. 25c. Switch contacts SW2 and SW1 shown in FIG. 28 and the pair of contacts W1 and W2 shown in FIG. 29 are typically connected to user operated mechanical switches that can be used to signal to the microcontroller different control options. These control options include but are not limited to start motor, stop motor, start motor with system deactivated, as well as readout of the error codes that may be present in the cartridge.

Additionally, the microcontroller can notify the operator of status information by pulling lines J2-2 or J3-2 in FIG. 30 to logic low to activate indicators such as LEDs (as in FIG. 30) or buzzers. For example, the microcontroller can flash the LEDs at certain rates and in certain combinations to indicate different error codes to the operator. A complex system will typically have many different types of possible errors (typically 20-100 or more) so to keep the system simple, one error code could represent a whole class of errors. To obtain more detailed information from a particular error code, for example, to identify the exact error that occurred out of many possible errors, the operator can turn and hold the mechanical keyswitch connected to contacts W1 and W2 while an error code is flashing on the LEDs and the microprocessor will send a new pattern flashing over the LEDs which indicates precisely the particular error that occurred. This provides a convenient way for the operator to supply valuable information to technicians or service personnel who could understand the more complex flashing code and determine the particular error that has occurred but is otherwise not discernable.

Figure 31:
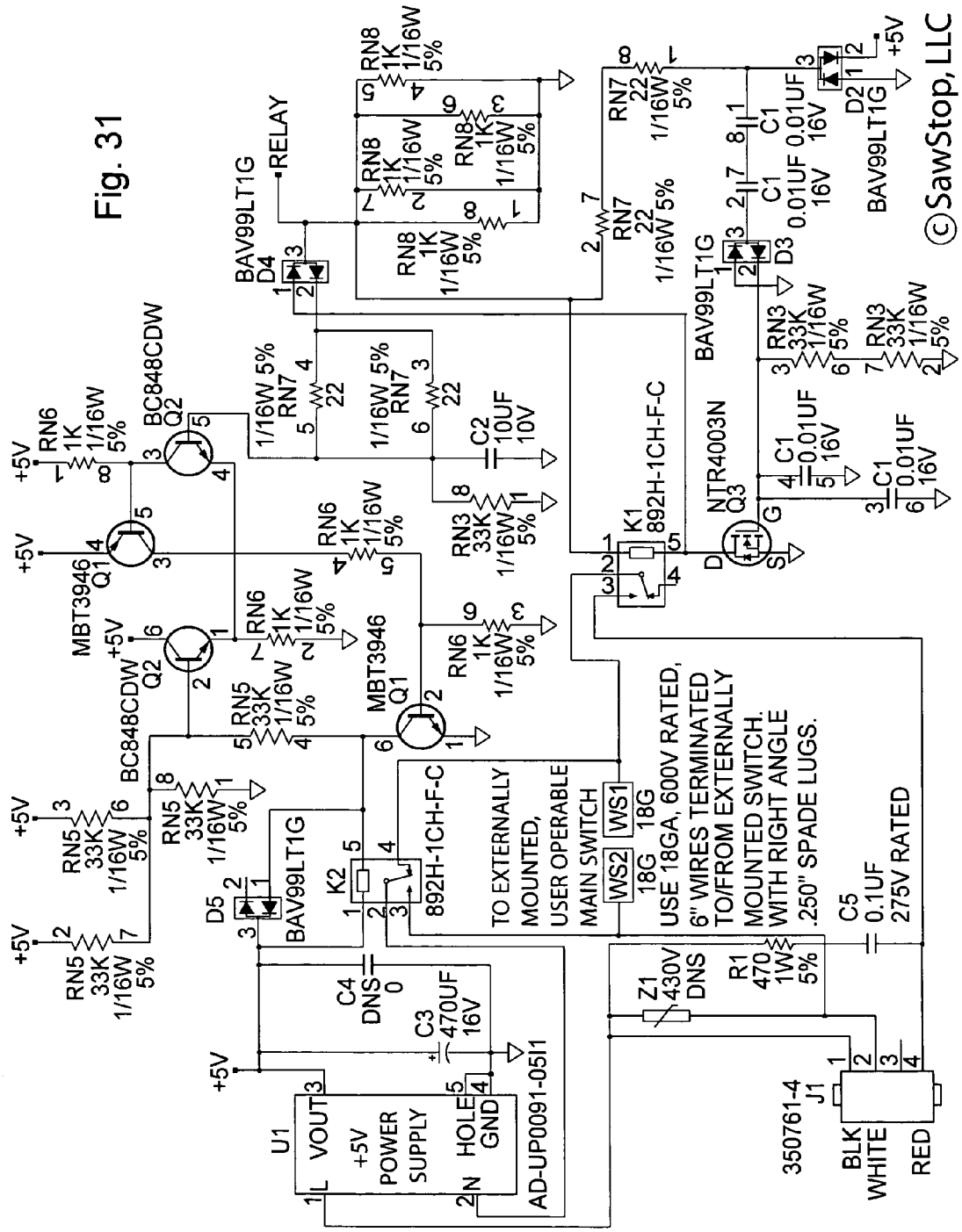
FIG. 31 is a diagram of a power controller circuit used to power a safety system.
Figure 32:
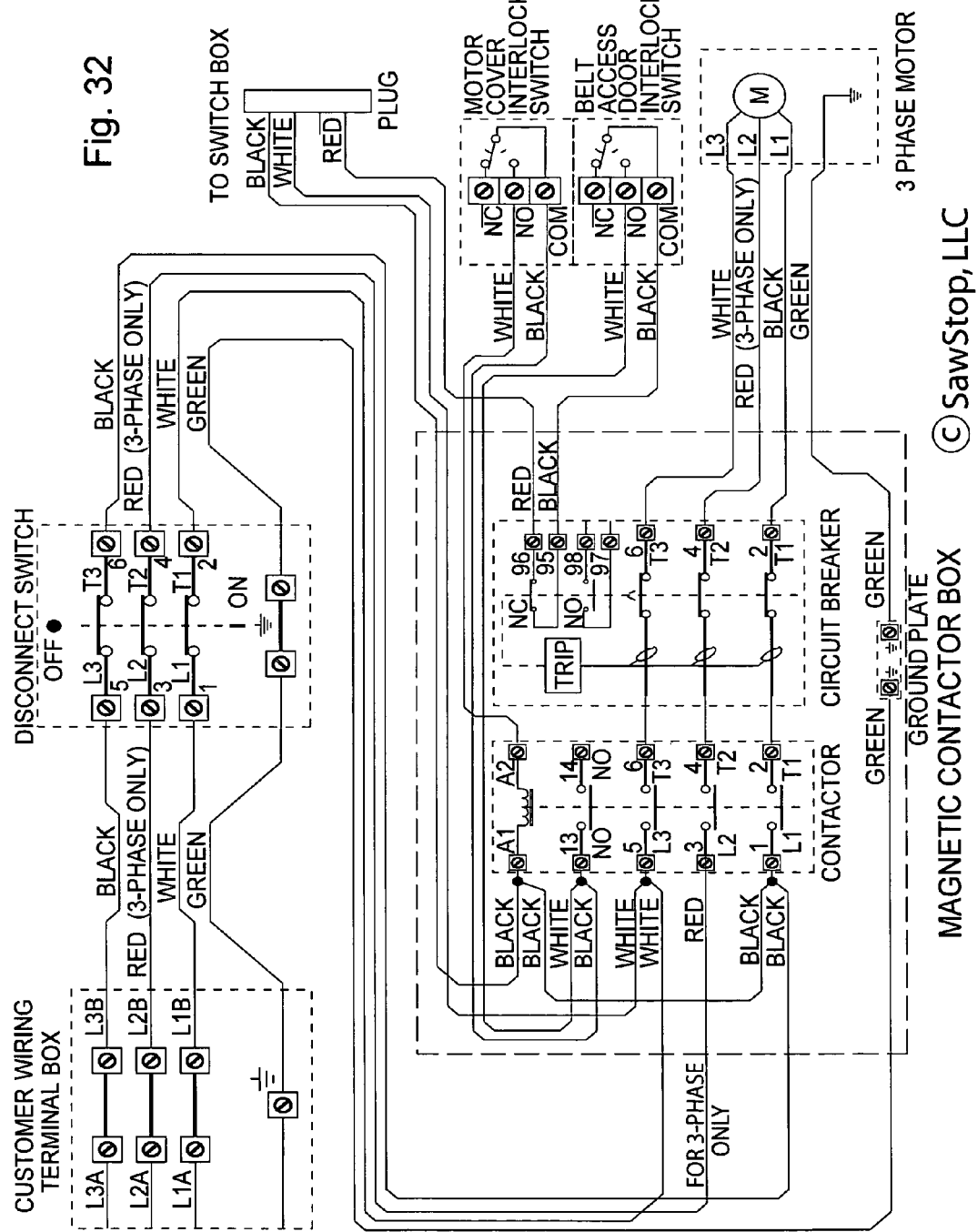
FIG. 32 is a diagram of a circuit which connects the output of a single-phase or three-phase 230V power source to the power circuit in FIG. 31.

FIGS. 31 and 32 taken together show a complete power supply circuit that may be implemented in power equipment such as a table saw and is suitable to use with the above described cartridge circuit. The power supply would receive line power, transform and isolate it as necessary, and supply power to the brake cartridge. In the circuit shown in FIG. 31, a universal 110V/240V, 50 Hz/60 Hz input switching power supply, U1, is used to generate 5V to supply power to the cartridge. WS1 and WS2 are contacts to a user operable main power switch which are connected when the user turns the main power on. When the main power switch is turned on, the 5V power supply U1 also goes on. Relay K1 is used to turn the saw motor on by connecting K1 pin 2 to K1 pin 3 thus effectively connecting plug J1 pin 2 to J1 pin 4 which completes a circuit (to be described below) used to power the motor. Relay K1 turns on in response to the status of the RELAY line which is controlled by the microcontroller within the cartridge. Right before the motor turns on, relay K2 is energized so that pins 2 and 3 of K2 are connected and it remains energized while the motor is on. If the main power switch is opened (turned OFF) for some reason while the motor is on, the motor will turn off but power will still be supplied to the safety system by U1 so that the safety system will still be active as the blade coasts to a stop.

The signal on RELAY may be high, low or pulsed. When RELAY is held high for a while, capacitor C2 charges through D4, RN7(pins6,3) and RN7(pins5,4). When RELAY goes low, C2 discharges through RN3(pins8,1). Since both C2 and RN3(pins8,1) have large values, it takes several hundred milliseconds for C2 to discharge. Thus, RELAY goes low and remains low for a while before C2 completely discharges. In the meantime, the voltage on C2 will remain high for a while even though RELAY is low. C2 will also maintain a high voltage if RELAY is pulsed frequently enough.

The voltage on C2 controls relay K2. Transistors Q2(pins 6,2,1) and Q2(pins 3,5,4) form a comparator which turns on Q1 (pins 4,5,3) and Q1(pins 6,2,1) when the voltage at the base of Q2(pins3,5,4), which is the voltage on C2, is greater than the voltage at the base of Q2(pins 6,2,1). This provides a clean, controlled signal at pin 5 of relay K2. When Q1(pins6,2,1) goes on, it pulls pin 5 of relay K2 low which energizes K2.

Capacitors C1(pins2,7) and C1(pins8,1) are also charged when RELAY is high. These capacitors along with D3 form a deadman circuit which charges capacitors C1(pins3,6) and C1(pins4,5) only when there is a transition (low to high) on the RELAY signal. Capacitors C1(pins3,6) and C1(pins4,5) are of a small value and discharge rapidly. Therefore, they need to be refreshed very frequently if they are to maintain a high enough voltage to turn on Q3. For example, in the current design, a pulse on RELAY with a pulse width of 6 us and a period of 96 us will keep the transistor on, but a pulse width of 96 us and a period of slightly more than 12 ms will not. When Q3 is on, it pulls pin 5 of relay K1 low so that K1 can be energized if a high enough average voltage appears on the RELAY signal.

Figure 33:
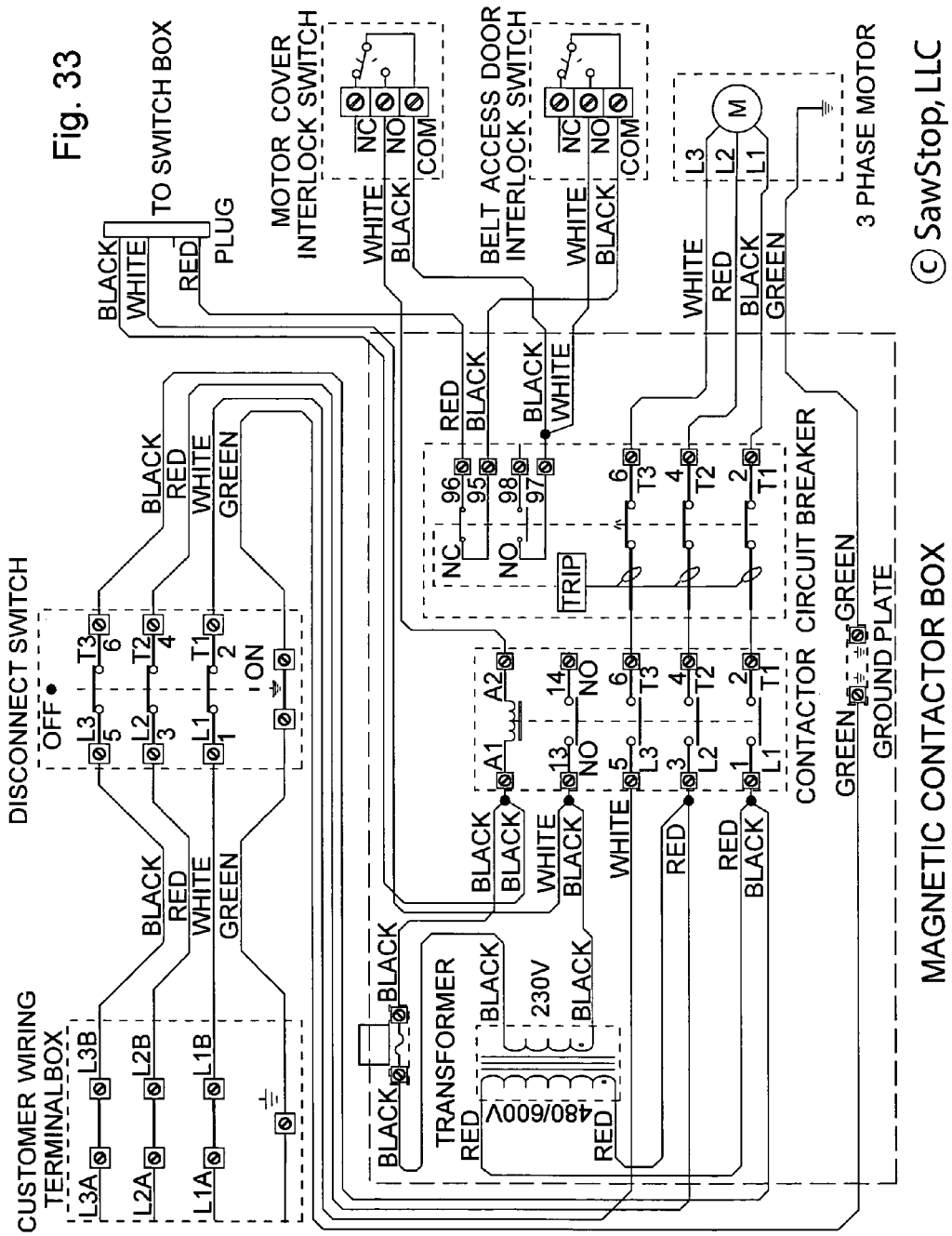
FIG. 33 is a diagram of a circuit which connects the output of a 480V or 600V three-phase power source to the power circuit in FIG. 31.

External power lines and a ground line are connected to the saw through a terminal box shown in FIG. 32. For three-phase systems, there are three power lines (labeled black, red, and white) and a ground line (labeled green). For single-phase systems there are only two power lines (labeled black and white) and a ground line (labeled green). These lines may be fed into a disconnect switch which enables the operator to disconnect power from the saw when, for example, performing adjustments, maintenance or repairs to the saw or when changing the saw blade. Furthermore, a lock mechanism may be used in conjunction with the disconnect switch to prevent any use of the tool. After the disconnect switch, the power lines and ground enter a magnetic contactor box which also includes a circuit breaker. When enough current flows through the coil between points A1 and A2 on the contactor, the contacts are closed so that current can flow through the contactor and the circuit breaker to power a motor. The coil is thus used to turn the motor on and off. In order for current to flow through the coil, the two interlock switches in FIG. 32 must be closed and the white power line connected to the plug going to the switch box must be connected within the switch box to the wire coming from the switch box plug and connecting to A2 of the coil. The interlock switches are used to detect when access panels such as a motor cover and a belt access door are closed and to keep the motor from turning on if one or both of them are open. The circuit breaker will shut power off to the motor in the event of excessive current. The circuit in FIG. 33 is an alternative circuit to the one shown in FIG. 32 and illustrates the use of a transformer to adapt the system to power sources with voltages higher than 230V. An optional fuse is also included to provide additional circuit protection.

Figure 34:
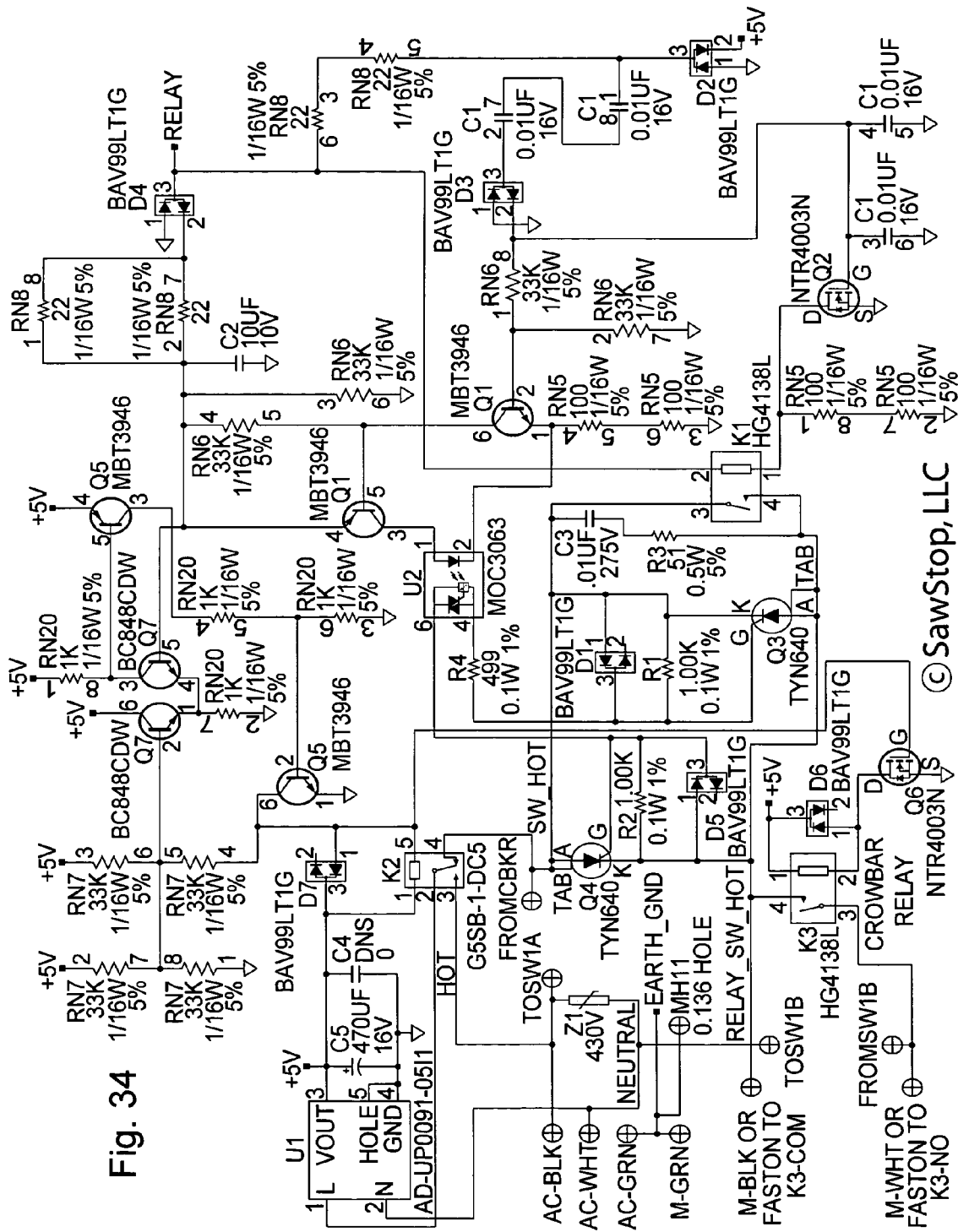
FIG. 34 is a diagram of a circuit used to power a safety system from a 120V AC power source.

In the case of smaller motors, a relay may be used to control the smaller motor directly, rather than energizing a coil on a contactor to control the motor. In this case a magnetic contactor box is not needed, only a relay that is rated for the correct hp load is required. An example of such a circuit is shown in FIG. 34. This circuit is designed to be powered by the power available from a standard US AC 120V outlet with ground connection. As before, relay K1 is used to switch power to the saw motor. In this case however, the current flowing through relay K1 is also the current that flows through the motor. To minimize arcing across the relay contacts when power is switched on and/or off, a bypass circuit composed of Q4/Q3/U2 is used to bypass current around the relay contacts for a short period after the relay contacts are opened or closed. It would be possible to control this bypass circuit from a separate control line, but use of control lines can be minimized by multiplexing this bypass control on the same line that energizes the relay coil. When the motor is on, the RELAY signal is a high duty pulse train that causes capacitors C1(pins3,6) and C1(pins4,5) to accumulate charge which is refreshed with every pulse. The resulting voltage across these capacitors keeps Q2 on and the high duty cycle (around 94%) of the RELAY signal results in a high enough average current to keep relay K1 closed. When the motor turns off, a lower duty cycle pulse train, typically around 10-13%, is sent to the relay coil that does not have sufficiently high voltage to keep the relay energized, but does gets detected through Q1(pins4, 5,3) and Q1(pins6,2,1) by SCR driver U2 which keeps SCRs Q4 and Q3 on in order to bypass the relay contacts. The duty cycle of the pulse train is then reduced to about 6% until coastdown at which point the SCRs are turned off Arcing across the relay contacts is thus minimized because current is diverted around the contacts after they open. Similar measures can also be taken when relay contacts open.

To help protect the SCRs from damage, the circuit in FIG. 34 contains a snubber formed by C3 and R3. The snubber limits how fast the voltage which appears across the SCRs can rise in time. This is to help prevent the SCRs from being turned on accidently by a rapidly changing voltage. Diodes D1 and D5 help to protect the SCRs from being damaged by clamping to a safe level the voltage which appears across each of their gates when each one goes off R4 limits the current through U2. U2 is a special zero cross switch that will wait until the voltage across its output terminals is very low before switching on. This times the activation of the SCR gates.

The circuit in FIG. 34 also includes a crowbar relay K3 that is kept on (closed) when the motor is off and turns off (opens) shortly before the motor turns on. The purpose of relay K3 is to be a failsafe relay which will trip the circuit breaker in case of any electrical failure in the SCR circuitry, or in case the contacts of relay K1 became welded closed, either of which could cause the system to lose control of the motor. The relay sequencing circuit is designed to turn off this crowbar relay before activating the motor energizing circuitry. The sequence also turns off the motor energizing circuitry before re-initializing this relay.

In order for the circuit in FIG. 34 to work properly, the relays need to open and close in a certain sequence. Before the motor is turned on, the SCRs will be off, crowbar relay K3 will be closed, the contact in relay K2 will be connected to pin 4, and the motor relay K1 will be open. When the cartridge pulls the RELAY signal high to turn on the motor, the contact in relay K2 switches to pin 3 and the crowbar relay K3 opens. Then, in the next sequence, the SCRs turn on and K1 closes. While the motor is running, high-duty periodic pulses keep the SCRs refreshed and relay K1 closed as discussed earlier. When the motor turns off, a new sequence is transmitted by the DSP. First relay K1 opens and then the SCRs are turned off after relay K1 has released. This is accomplished by pulses on the RELAY line that are of a low enough duty cycle that they are not able to supply a strong enough average current to keep K1 on, but are still toggling and able to keep the SCRs on. For example, the duty cycle is reduced from 96% to 13% and then to down to 6%. Once enough time passes that K1 is completely open, the SCRs go off but pulses of even lower duty cycle (0.8%) and a much lower frequency continue on RELAY in order to keep C2 charged so that pins 2 and 3 of K2 are connected and crowbar relay K3 is open while the blade continues to coast down. After the blade has coasted to a stop, the contact in relay K2 switches back to pin 4 and crowbar relay K3 closes again.

Figure 35:
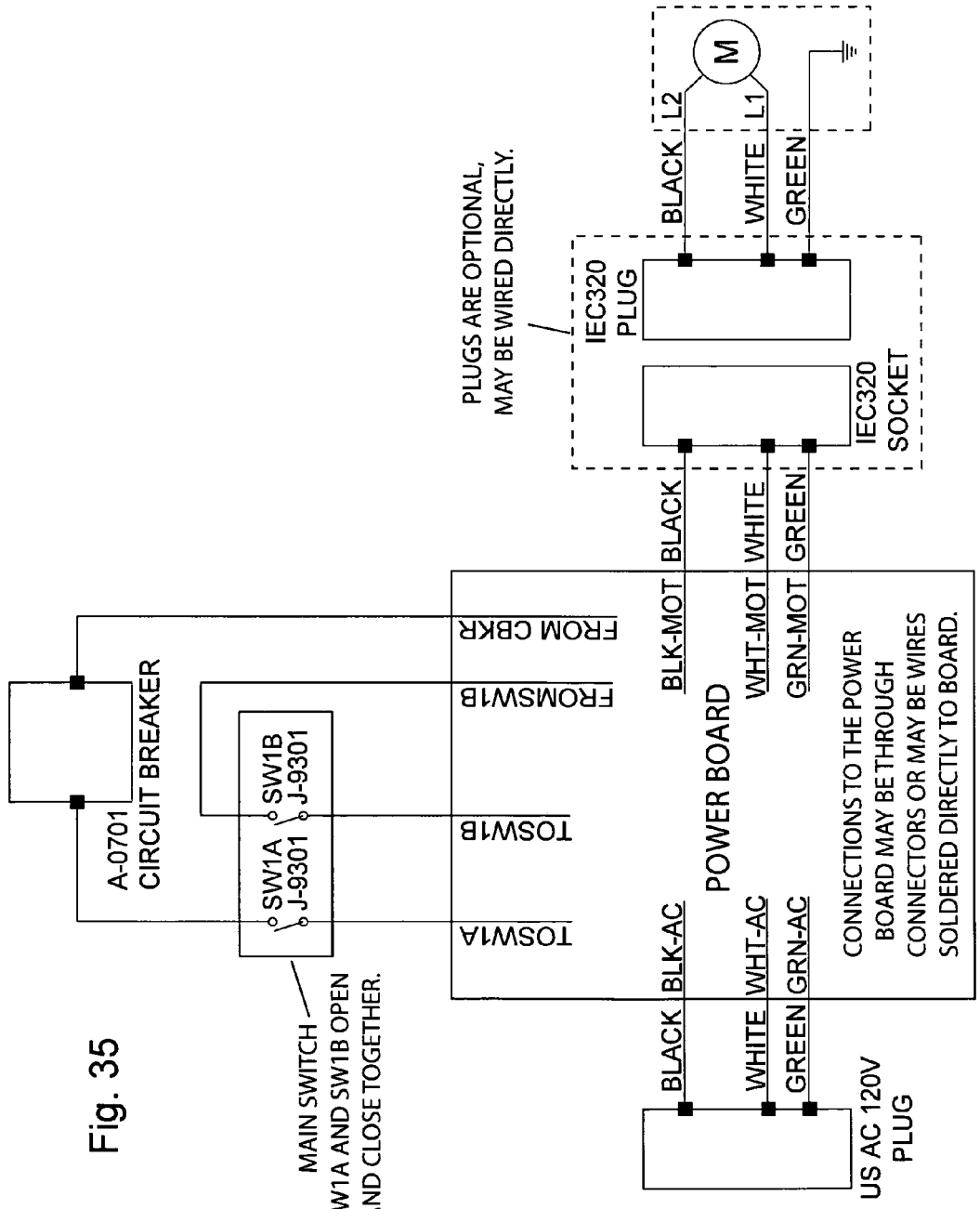
FIG. 35 is a diagram of a system incorporating the circuit in FIG. 34.

FIG. 35 shows the connections between a power board containing the circuit in FIG. 34 and a motor, a user operable main switch, a circuit breaker and a 120V plug. These connections to the power board may be made through the use of connectors or by wires soldered directly to the board. Again, FIGS. 34 and 35 together compose an alternative arrangement to that of FIGS. 31 and 32.

The circuit shown in FIG. 31 may be housed in a switch box mounted on the saw along with the circuits shown in FIGS. 27-30. Alternatively, the circuit shown in FIG. 34 may be housed in the switch box along with the circuits shown in FIGS. 27-30. A possible switch box is described in U.S. Patent Application Publication No. 2005/0139459 A1, entitled "Switch Box for Power Tools with Safety Systems," which is hereby incorporated into this document by reference.

Figure 36:
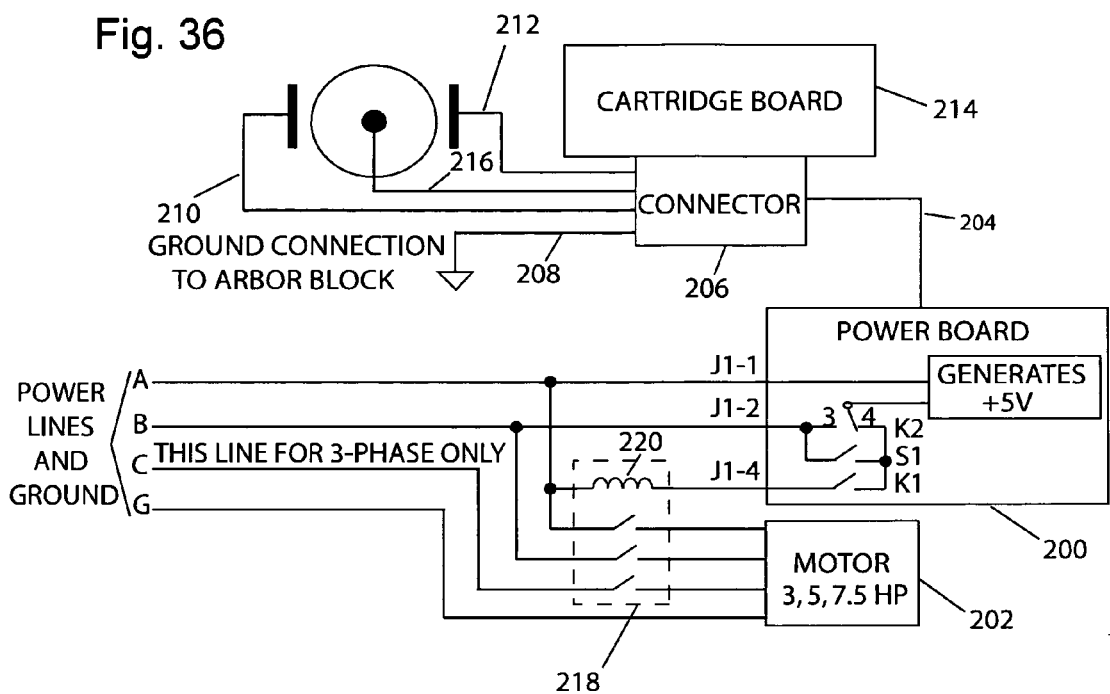
FIG. 36 is a diagram showing connections between components in machines using motors connected to a 230V power source.

FIG. 36 shows a high level view of how the circuits discussed above may be incorporated into a machine such as a saw having a relatively large motor (e.g., a 3, 5 or 7.5 horsepower single phase or three phase motor). A power board 200, having a power supply circuit like the one disclosed in FIG. 31, may be housed in a switch box mounted on the machine. Power Lines A and B are supplied to power board 200 at connections J1-1, and J1-2, respectively. Power lines A and B and C are all connected to a contactor 218 having a coil 220 and through the contactor to motor 202 which also receives a ground connection. When current runs through coil 220, the contact switches in 218 are closed and the motor turns on. The power board turns on the motor by supplying power to the coil 220.

Power board 200 contains two relay switches, K1 and K2, and one user controlled switch, S1. These switches are used to control whether power is supplied to the cartridge, rotation sense circuit board and motor. The positions of these switches before the machine is turned on and the relays energized are shown in FIG. 36. When S1 is closed, all but the motor is powered up. The five volt power supply present on the power board (U1 in FIG. 31) supplies power to the cartridge and rotation sense circuit board. At this point the safety system is fully operational. Relays K1 and K2 are controlled by circuitry on the cartridge board. K1 closes and K2 flips to the other contact (labled 3) when the cartridge sends a signal to the power board to turn on the motor. When K1 closes, the motor turns on as long as S1 remains closed. If S1 is opened while the motor is running, the motor will turn off. However, because power is now supplied to the five volt power supply through K2, the safety system will continue to operate even if S1 is opened for some reason. This is a safety feature to ensure that the safety system will still be operational while the blade is coasting down even if the main switch, S1, is turned off by a user while the motor is running.

A cable 204 connects the power board to a connector 206. In the circuits discussed above, cable 204 is preferably a nine-conductor cable with a ground shield and connector 206 is a D-Sub style connector with 9 conductors.

Wires 208, 210, 212 and 216 also connect to connector 206. Wire 208 is a ground wire attached to a portion of the machine such as an arbor block in a saw to insure a secure ground connection between the contact detection circuitry and the structure of the saw. Wires 210 and 212 connect to the electrodes used in the detection subsystem to impart a signal to a designated portion of the machine such as to the blade in a table saw, as discussed above. Wire 216 connects to the circuit board that is mounted adjacent to the arbor and contains the Hall effect sensor which is used to sense whether a cutting tool in the machine is rotating. This circuit is detailed above and additional detail is disclosed in U.S. Patent Application Publication No. 2005/0041359 A1, entitled "Motion Detecting System for Use in a Safety System for Power Equipment," the disclosure of which is herein incorporated by reference.

One portion of connector 206 is mounted in the machine and another portion is mounted on a cartridge board 214 housed in a replaceable cartridge. The cartridge board may include the exemplary circuits shown in FIGS. 7 through 21, as stated. The connection between the two portions of connector 206 is made when the cartridge is installed in the machine.

In the circuits discussed above, the female portion of the connector would preferably be mounted in the machine and the male portion would preferably be mounted on the cartridge because the pins in the male portion are more easily damaged and it is easier to replace the cartridge than it is to replace the female portion of the connector which is mounted semi-permanently in the saw.

Figure 37:
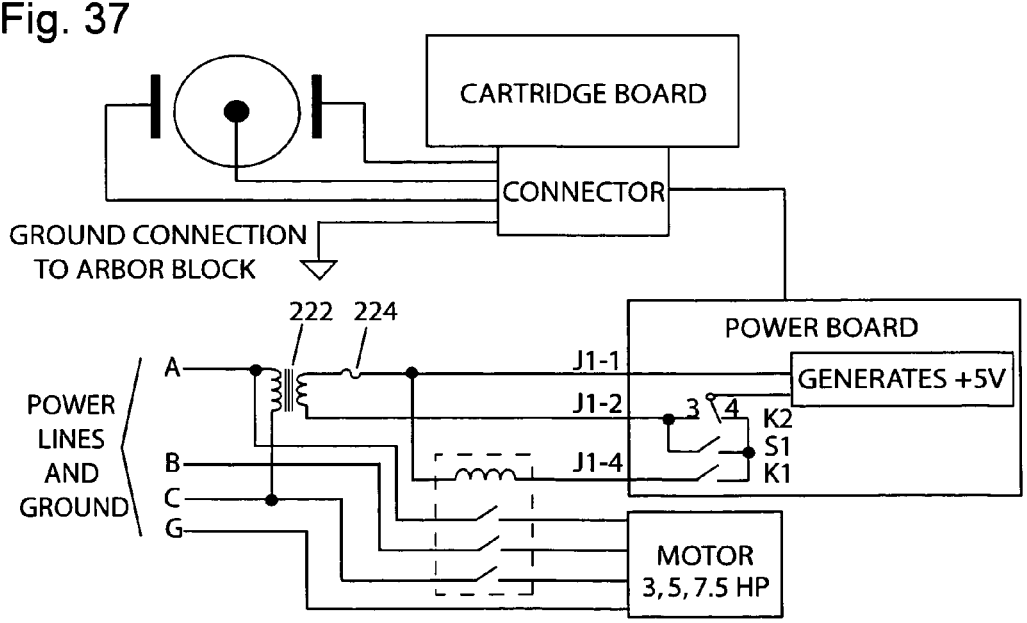
FIG. 37 is a diagram showing connections between components in machines using motors connected to power sources higher than 230V.

FIG. 37 shows an arrangement similar to that of FIG. 36 that may be used for three-phase power sources other than 230V. A transformer 222 converts a higher line voltage (for example, 415V, 480V or 600V) to 230V before being fed to the power board. An optional fuse 224 may be added on either side of the transformer for extra circuit protection.

Figure 38:
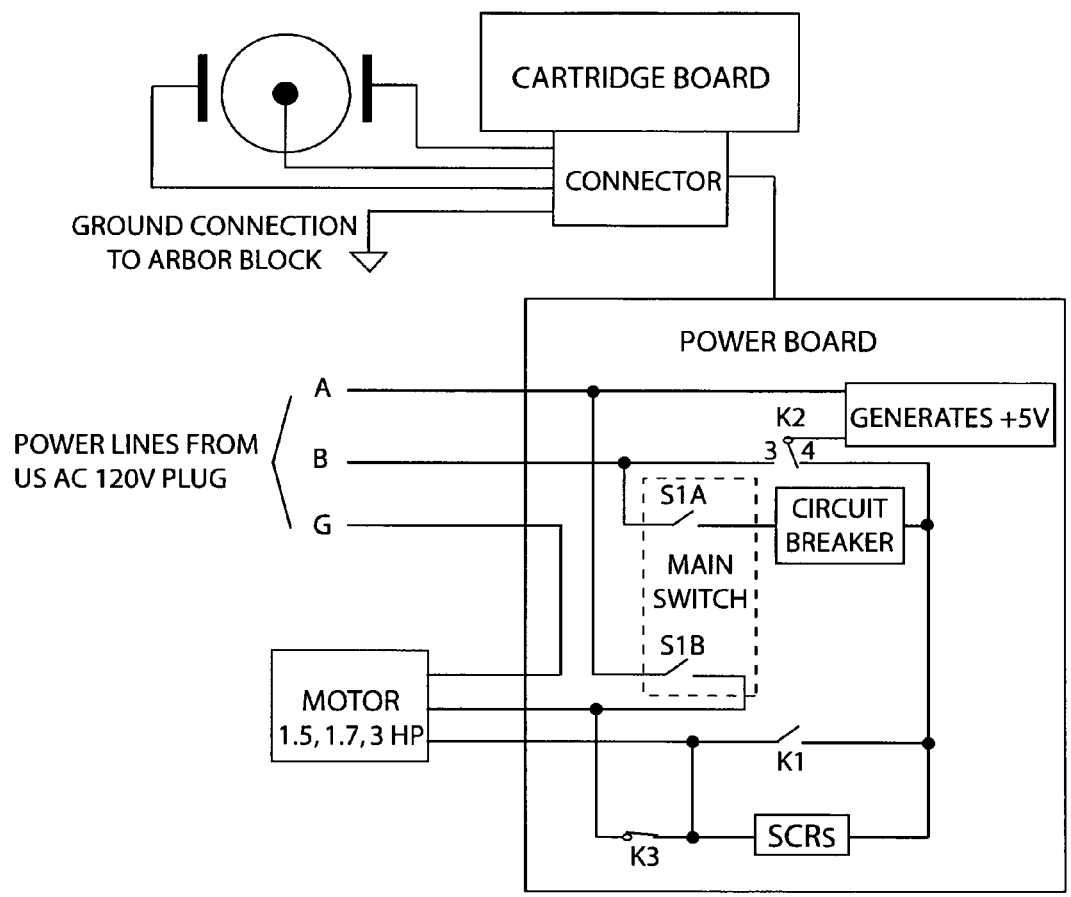
FIG. 38 is a diagram showing connections between components in machines using motors connected to a standard 120V AC power source.

FIG. 38 shows how the circuits discussed above may be incorporated into a machine such as a saw having a smaller motor (e.g., a 1.5 to 3 horsepower motor powered by single phase power). The connections between the power board, connector, cartridge board, electrodes, Hall effect sensor and ground are similar to those shown in FIG. 36.

In this case, the power board would have a power supply circuit like that one disclosed in FIG. 34 and may be housed in a switch box on the machine. The power board is connected to ground and to power lines A and B. A motor is connected to ground and to power lines A and B through the power board. The circuitry on the power board turns the motor on by supplying power to the motor. In this arrangement, two relay switches, K1 and K2 and a user controlled switch, which consists of two parts S1A and S1B, are used to control whether power is supplied to the cartridge, rotation sense circuit board and motor. S1A and S1B are two parts of the same user controlled switch and thus open and close together. K1, S1A and S1B taken together, and K2 work the same way as K1, S1 and K2 described above for FIG. 36. S1B is added to disconnect power line A from the motor since there is no contactor box to do this in this arrangement as there was in FIG. 36. Crowbar relay K3 and the circuit breaker are also shown as well as the position of the SCR circuitry. The crowbar relay is closed when the motor is off and opens when the motor is turned on. Again, the purpose of the crowbar relay is to trigger the circuit breaker if there is a short across the SCR circuitry or welding of the contacts of K1 as such a short would cause the motor to go on as soon as the main switch (S1A and S1B) is closed instead of turning on when the motor turn-on switch (and thus K1) is closed.

Two copies of a computer program that is one implementation of the methods discussed above are being submitted concurrently on two compact discs as a Computer Program Listing Appendix. That program is incorporated into this document by reference. The computer program comprises a full description of the methods described herein, and is intended for operation with the circuits shown in FIGS. 7 through 35. The program is most specifically written in assembly language to run on a Texas Instruments TMS320F2801PZA digital signal processor or on other similar processors.

It can be seen from examination of the attached computer code in combination with the above-described circuits that the disclosed system implements a wide variety of self-tests. In particular, the system tests the SCR and the circuit that drives the gate of the SCR at power up if the voltage on the capacitor is low enough that the fuse wire will not be degraded by firing the SCR and releasing the charge in the capacitor. The voltage as a function of time during the discharge is monitored to make sure that the SCR, capacitor and discharge path have a sufficiently low series resistance to cause the fuse wire to break if the discharge occurs at high voltage. Also, the time of the peak discharge current relative to the turn on pulse to the SCR is monitored to verify the functionality of the SCR and gate drive circuitry.

After the SCR test is completed the high voltage energy storage capacitor is charged to its operational voltage. Once this is done, the capacitor is first tested to make sure it reaches the correct voltage level at which it will have sufficient energy to burn the fuse wire. With the capacitor charged to its operational voltage, a short discharge under a known resistive load is carried out. The current in the discharge and the voltage drop on the capacitor during the discharge are both measured and cross-correlated with the operation voltage to insure that the capacitor has sufficient capacitance to burn the fuse wire when charged to the operational voltage. In addition, the measurement of discharge current provides a redundant direct measure of the voltage on the capacitor. Thus, if the resistive divider network that is used to sample the voltage on the high voltage capacitor is degraded in some way, the current measured during discharge will not match its expected value and an error can be set to warn the user of a failure in the circuit. This discharge test is preferably carried out periodically whenever the saw is powered up to insure that the high voltage capacitor is fully functional at all times.

The bypass and start switches, described in the publication incorporated by reference above titled "Switch Box for Power Tools with Safety System," that are part of the user interface also include a self-test function. In particular, when power is applied to the circuit, both the bypass and start switches must be in the off condition before an on condition will register with the system. For instance, if the start switch is inadvertently placed in the on condition prior to the application of power to the system, then when power is applied, an error will be set that will prevent the system from operating the motor until the start switch is cycled to the off position. The same is true of the status of the bypass switch. Also, the status of the switches is sampled multiple times prior to accepting a change of state. For instance, in order for the start switch to register as on, the system samples the start switch multiple times over the course of many milliseconds or tens of milliseconds and if it finds the switch in the on condition during each sample, it will recognize the start switch as being in the on condition. As illustrated in the attached code, similar functionality is incorporated into recognizing a turn off command on the start switch.

In addition, engagement of the bypass mode, wherein the contact detection system is temporarily disabled, is controlled by the bypass switch. In particular, as illustrated in the attached code, in order to engage the bypass mode, the bypass switch is turned and held in the turned position for a first period of time prior to engaging the start switch. Then, once the start switch is engaged, the motor turns on while the bypass switch continues to be held in the turned position for a second period of time. If this pattern is started but interrupted prior to completion, the motor will turn off if it is already on and the sequence must be started again from the beginning. The use of an activation pattern for the bypass insures that the bypass system will not be engaged by accident and that there will be no mistake as to whether the bypass was correctly engaged. In addition, once the bypass is engaged, the LED's in the user interface are illuminated in a predetermined fashion to indicate to the user visually that the bypass is engaged. It should be noted that the bypass switch is key controlled to allow a shop supervisor or other person to remove the key to prevent the system from being used in the bypass mode.

As mentioned earlier, the code periodically tests for the spacing between the brake pawl and the saw blade. This test is used to insure that the operator doesn't attempt to operate the saw with a blade that is too small for the installed brake cartridge, or with a blade that has a non-conductive hub, since the safety system cannot operate effectually under these conditions.

As also mentioned earlier, the level of the voltages supplying power to circuits in the cartridge are monitored and errors are set if the voltages are found to be too high or too low. In addition, the temperature within the cartridge is monitored and if found to be too low, a heater is activated to raise the temperature within the cartridge so that the circuits can function properly. If the temperature is found to be too high, an error is set and the motor is turned off until the error is cleared.

Numerous checks are built into the contact detection signal path as described in the circuit above when taken in combination with the attached code. First, the contact detection signal must generate a desired output at the integrator or the system will set an error and the motor will not start. Thus, if a wire is broken, or the blade is accidentally grounded, the operator will not be able to start the motor and an error code will be flashed on the LED's in the user interface.

When the system is first powered up, the attached code uses the impedance characteristics of the blade sensed at power up to reset a nominal drive level value. This value is used to determine whether there is any electrical loading of the blade such as might be present if a user was in contact with the blade. Since any loading of the blade causes the signal to go down and/or the drive level to go up, by looking at the current drive level relative to the nominal drive level, the system can tell whether a person might be contacting the blade and not allow the motor to start if that is the case. The nominal drive level can change with temperature and time and therefore is preferably adjusted over time to track the correct value. The disclosed algorithms do this in an asymmetric fashion. In particular, the nominal drive level will track downward changes relatively quickly, while responding to upward changes relatively slowly. The reason for this asymmetry is that virtually all externally induced changes to the signal on the blade cause the nominal drive level to go up, so that if there is a drop in the current drive level, it is likely a result of removal of an externally induced load on the blade or drift of the properties of electrical components and that such changes should be reflected in the nominal drive level. However, an increase in the actual drive level, on the other hand, could be due to cutting wet wood, and that increase in drive level should not be reflected in the nominal drive level, which is supposed to be the expected drive level with no such perturbations. The various contact detection thresholds can be scaled up or down based on the relationship between the actual and nominal drive levels to maintain the desired sensitivity.

As discussed earlier, the various detection schemes are monitored so that if a background noise level causes the detection schemes to reach a level close to but not exceeding the trigger level, the system will shut off the saw without triggering the braking system to warn the user that an unnecessary activation of the brake is imminent.

In addition to tracking the response level of the detection schemes, the attached code is configured to track the drive signal level and shut off the motor if the drive level required to maintain the sensed signal at the target level exceeds some threshold. This can occur if a user tries to cut extremely wet wood, for instance. Monitoring the drive level and shutting the motor off if the drive level exceeds a threshold level provides yet another method of reducing the chance of an unnecessary activation of the brake and provides a method to insure that the motor only continues to operate so long as contact can reliably be detected. Given the various component tolerances, it may be desirable to calibrate the nominal drive level at the time of manufacture to provide a more accurate measure of the actual drive level required under nominal conditions to have the sensed signal in regulation. The ratio of the current drive level to this nominal drive level is the preferred control off of which the drive level motor turn off threshold and the contact detection threshold are adjusted.

The attached code also embodies tracking of the AGC regulation. In particular, the AGC is designed to maintain the nominal sensed signal at a predetermined level. If the sensed signal deviates from that level, an AGC error is generated. This error is tracked and averaged on a time scale longer than tooth strike events to insure that the AGC is in regulation. If the average or characteristic level of the AGC error is greater than some threshold when computed over a sufficiently long time, then an error is set which prevents operation of the motor or causes it to turn off if it is already on.

INDUSTRIAL APPLICABILITY

The systems and components disclosed herein are applicable to power equipment and to safety systems that detect dangerous conditions with power equipment.

It is believed that the disclosure set forth above encompasses multiple distinct inventions with independent utility.

While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions.

The invention claimed is:

1. A woodworking machine comprising:
a cutter adapted to move to cut a workpiece;
a motor configured to move the cutter;
a safety system operatively associated with the cutter and configured to detect a dangerous condition between a user and the cutter, where the safety system includes a controller; and
a motor control system configured to selectively turn the motor on and off;
where the motor control system is controlled by the safety system, and where the controller in the safety system signals the motor control system to turn the motor off upon detection of the dangerous condition;
where the motor control system includes a motor control circuit adapted with at least one control input, and where the motor control circuit is configured to turn the motor on only upon receipt of a non-constant signal from the controller on the control input; and
where the controller is located remotely from the motor control system and operatively coupled to the motor control system by a cable.

2. The woodworking machine of claim 1, wherein the motor control system includes a solid state switching mechanism and a mechanical switching mechanism, each independently wired in parallel to control the motor and wherein the motor control circuit is adapted to turn on the solid state switching mechanism upon receipt of a first non-constant signal and to turn on the mechanical switching mechanism upon receipt of a second non-constant signal different from the first non-constant signal.

3. The woodworking machine of claim 2, wherein the controller is adapted to output the first non-constant signal for a first interval of time upon turning on the motor and then outputting the second non-constant signal.

4. The woodworking machine of claim 3, wherein the first and second non-constant signals are pulse width modulated signals and the pulse width modulation is different for the first and second non-constant signals.

5. The woodworking machine of claim 2, wherein the controller is adapted to output the second non-constant signal while the $_{motor}$ is operating and to output the first non-constant signal for a period of time prior to turn off of the motor.

6. The woodworking machine of claim 1, where the motor control system includes a motor power switching mechanism to selectively switch power to the motor and a shunt switching mechanism configured to selectively provide a low resistance path in parallel with the motor, wherein the motor control input is configured to select the shunt switching mechanism when the motor control circuit is receiving a constant signal on the motor control input.

7. The woodworking machine of claim 1, including a main power switch operatively connected with the safety system and configured to selectively supply power to the safety system, and a main power bypass circuit configured to prevent the main power switch from disconnecting power to the safety system when the motor is running.

8. The woodworking machine of claim 7, where the cutter is configured to rotate, further including a rotation sensing system configured to sense rotation of the cutter, where the rotation sensing system receives discontinuous indications of rotation and is configured to predict the time the cutter stops rotating by extrapolation of the discontinuous indications of rotation, further wherein the rotation sensing system is coupled to the controller to prevent the main power switch from disconnecting power to the safety system when the cutter is rotating.

9. A woodworking machine comprising:
a cutter adapted to rotate to cut a workpiece;
a motor configured to rotate the cutter;
a safety system operatively associated with the cutter and configured to detect a dangerous condition between a user and the cutter,
a reaction system configured to take some action to protect the user upon detection of the dangerous condition; and
a rotation sensing system configured to sense rotation of the cutter, where the rotation sensing system receives discontinuous indications of rotation and is coupled to send a signal to the safety system to prevent action by the reaction system when the cutter stops rotating, where the rotation sensing system is configured to predict the time the cutter stops rotating by extrapolation of the discontinuous indications of rotation.

10. The woodworking machine of claim 9, wherein the discontinuous indications of rotation are electrical pulses occurring a small integral number of times per rotation of the cutter.

11. The woodworking machine of claim 9, wherein the cutter is mounted to an arbor and the arbor includes a magnet, wherein the discontinuous indications of rotation are electrical pulses from a Hall effect sensor located adjacent to the arbor and the Hall effect sensor is configured to detect rotation by periodic passage of the magnet.

* * * * *

UNITED STATES PATENT AND TRADEMARK OFFICE
CERTIFICATE OF CORRECTION

PATENT NO. : 8,469,067 B2  Page 1 of 1
APPLICATION NO. : 13/135391
DATED : June 25, 2013
INVENTOR(S) : Stephen F. Gass et al.

It is certified that error appears in the above-identified patent and that said Letters Patent is hereby corrected as shown below:

In the Claims:

In column 35, line 51, claim 5, delete "$_{motor}$" and insert --motor--.

Signed and Sealed this
Tenth Day of September, 2013

Teresa Stanek Rea
*Acting Director of the United States Patent and Trademark Office*